US006736591B2

(12) United States Patent
Buck

(10) Patent No.: US 6,736,591 B2
(45) Date of Patent: May 18, 2004

(54) AUTOMATIC PALLET FABRICATION APPARATUS AND METHODS

(75) Inventor: Christopher B. Buck, Richmond, VA (US)

(73) Assignee: Libla Industries, Poplar Bluff, MO (US)

(*) Notice: Subject to any disclaimer, the term of this patent is extended or adjusted under 35 U.S.C. 154(b) by 0 days.

(21) Appl. No.: 09/972,795

(22) Filed: Oct. 5, 2001

(65) Prior Publication Data

US 2002/0104210 A1 Aug. 8, 2002

Related U.S. Application Data

(62) Division of application No. 08/820,945, filed on Mar. 19, 1997, now Pat. No. 6,430,800.

(51) Int. Cl.[7] .............................................. B65G 59/06

(52) U.S. Cl. .................... 414/797.9; 198/360; 198/364; 198/370.01; 209/653; 209/916

(58) Field of Search ................................ 209/653, 916; 198/364, 360, 370.01; 29/430, 432, 772; 221/167, 168; 227/113; 414/799, 797.9, 927

(56) References Cited

U.S. PATENT DOCUMENTS

| | | | | |
|---|---|---|---|---|
| 1,882,197 A | | 10/1932 | Skriba et al. | |
| 3,010,160 A | * | 11/1961 | Lytton et al. | 198/360 X |
| 3,089,443 A | | 5/1963 | Asnes | |
| 3,178,053 A | | 4/1965 | Robinson | |
| 3,231,101 A | | 1/1966 | Cooper | |
| 3,310,080 A | * | 3/1967 | Delcellier | 198/360 X |
| 3,628,714 A | | 12/1971 | Offenwauger | |
| 3,706,408 A | | 12/1972 | Burch | |
| 3,755,871 A | | 9/1973 | Nelson, Jr. | |
| 3,893,610 A | | 7/1975 | Smith | |
| 3,934,713 A | | 1/1976 | Van der Meer et al. | |
| 3,945,549 A | | 3/1976 | Colson | |
| 3,968,560 A | | 7/1976 | Vial | |
| 4,049,181 A | | 9/1977 | Kametaki | |
| 4,054,236 A | | 10/1977 | Paxton | |
| 4,168,566 A | | 9/1979 | Streckert | |
| 4,235,005 A | | 11/1980 | James | |
| 4,273,490 A | | 6/1981 | James | |
| 4,346,506 A | | 8/1982 | Martindale | |
| 4,367,835 A | | 1/1983 | Stephenson | |
| 4,373,651 A | | 2/1983 | Fanslow | |
| 4,385,564 A | | 5/1983 | Heggenstaller | |
| 4,389,012 A | | 6/1983 | Grikis et al. | |
| 4,392,600 A | | 7/1983 | Billett et al. | |
| 4,394,952 A | | 7/1983 | Crane | |
| 4,403,388 A | | 9/1983 | Belcher | |
| 4,444,348 A | | 4/1984 | Campbell, Jr. | |
| 4,463,888 A | | 8/1984 | Geist et al. | |
| 4,478,361 A | | 10/1984 | McElhannon | |
| 4,479,600 A | | 10/1984 | Albright | |
| 4,487,355 A | | 12/1984 | Ginnow et al. | |
| 4,489,819 A | | 12/1984 | Perrin et al. | |
| 4,503,993 A | | 3/1985 | Ginnow et al. | |
| 4,508,483 A | | 4/1985 | Hessling et al. | |
| 4,540,325 A | | 9/1985 | Heisler | |

(List continued on next page.)

FOREIGN PATENT DOCUMENTS

| | | | | |
|---|---|---|---|---|
| JP | 4-354719 | * | 12/1992 | 198/360 |

*Primary Examiner*—Janice L. Krizek
(74) *Attorney, Agent, or Firm*—Myers Bigel Sibley & Sajovec

(57) ABSTRACT

A hopper loading system for a pallet making apparatus includes a first conveying system for conveying a layer of stringers from a stacked array in adjacent substantially horizontal relation along a first direction, and a second conveying system for conveying stringers in adjacent substantially horizontal relation to one of a plurality of hoppers along a second direction substantially transverse to the first direction.

29 Claims, 12 Drawing Sheets

U.S. PATENT DOCUMENTS

| | | | | |
|---|---|---|---|---|
| 4,575,702 | A | | 3/1986 | Nitta et al. |
| 4,601,408 | A | | 7/1986 | Billing et al. |
| 4,613,032 | A | | 9/1986 | Berger et al. |
| 4,630,766 | A | | 12/1986 | Steeves et al. |
| 4,743,154 | A | | 5/1988 | James et al. |
| 4,757,605 | A | | 7/1988 | Richardelli |
| 4,782,989 | A | | 11/1988 | Wallin et al. |
| 4,784,306 | A | | 11/1988 | Baum |
| 4,795,074 | A | | 1/1989 | Francis |
| 4,820,103 | A | | 4/1989 | Dorner et al. |
| 4,824,004 | A | | 4/1989 | Hanson |
| 4,867,364 | A | | 9/1989 | Wallin et al. |
| 4,902,195 | A | | 2/1990 | Lucas |
| 4,955,794 | A | | 9/1990 | Fluck |
| 4,964,782 | A | | 10/1990 | DeCrane |
| 4,967,948 | A | | 11/1990 | Allspaw |
| 5,052,307 | A | | 10/1991 | Morrison |
| 5,058,795 | A | | 10/1991 | Tonus |
| 5,095,605 | A | | 3/1992 | Tonus |
| 5,123,359 | A | | 6/1992 | DelBalso |
| 5,184,558 | A | | 2/1993 | Wozniacki |
| 5,192,012 | A | | 3/1993 | Schafer et al. |
| 5,193,729 | A | | 3/1993 | Dewey et al. |
| 5,199,506 | A | | 4/1993 | Dewey et al. |
| 5,199,625 | A | | 4/1993 | Dewey et al. |
| 5,249,352 | A | | 10/1993 | Landers |
| 5,312,022 | A | | 5/1994 | Thompson et al. |
| 5,316,200 | A | | 5/1994 | Wallin |
| 5,322,189 | A | | 6/1994 | Oda |
| 5,375,315 | A | | 12/1994 | Griffith et al. |
| 5,379,513 | A | | 1/1995 | Thompson et al. |
| 5,555,617 | A | | 9/1996 | Pope |
| 6,176,009 | B1 | * | 1/2001 | Inman ......................... 29/772 |
| 6,430,800 | B1 | * | 8/2002 | Buck ........................... 29/430 |

* cited by examiner

AUTOMATIC PALLET FABRICATION APPARATUS AND METHODS

CROSS REFERENCE TO RELATED APPLICATION

This application is a divisional of application Ser. No. 08/820,945, filed Mar. 19, 1997, entitled AUTOMATIC PALLET FABRICATION APPARATUS AND METHODS, now U.S. Pat. No. 6,430,800, assigned to the assignee of the present invention, the disclosure of which is hereby incorporated herein by reference.

FIELD OF THE INVENTION

The present invention relates generally to wood product fabrication and more particularly to the fabrication of wooden pallets.

BACKGROUND OF THE INVENTION

Wooden pallets for transporting and storing goods are widely used in commerce and industry, and are particularly adapted to be handled by fork lift type handling equipment. A typical pallet is constructed by nailing a series of deck boards to a supporting base of transversely positioned, spaced apart stringers. The deck boards form a load supporting surface upon which goods to be transported are placed. A pallet may have deck boards nailed to only one side of the transversely positioned stringers, but customarily they are nailed to both sides.

Attempts have been made to automate various aspects of the pallet fabrication process. For example, in U.S. Pat. No. 5,095,605 to Tonus, the automatic nailing of deck boards to stringers is described. In U.S. Pat. No. 3,706,408 to Burch, the automatic feeding of deck boards and stringers to a pallet assembly area are described.

Typically, stringers are pre-cut and stacked into arrays and placed within close proximity of pallet fabrication devices. These stringers are typically manually unloaded from these stacked arrays and placed within various feeder devices which automatically position them for assembly. It would be desirable to automate the handling of stringers such that multiple stringers could be moved simultaneously into the feeding devices. Unfortunately, the slender nature of stringers makes handling via automatic devices somewhat difficult. Also, the stringers have a tendency to bind up when pushed in groups.

Attempts to automate the step of nailing the deck boards and stringers together have primarily focused on the use of hydraulically operated nailing devices and on the use of "collated" nails (i.e., nails that are packaged and presented to the nailing device in an interconnected fashion). Unfortunately, hydraulically operated nailing devices have several drawbacks. The nailing speed of a hydraulically operated ram often requires the nailing device to pause briefly each time a nail is to be driven into a deck board and stringer. As a result, pallet production rates are somewhat limited. In addition, hydraulically operated nailing stations use hydraulic fluid, which can be somewhat messy and require a certain amount of maintenance to avoid leaks.

Attempts to automate the nailing of deck boards to stringers have typically utilized collated nails as opposed to bulk nails because collated nails are typically easier to handle at high speeds than are bulk nails. Another reason collated nails have been favored is that controlling the delivery of bulk nails to a nailing station operating at high production speeds has proven somewhat difficult. Unfortunately, the cost of collated nails is often several times that of bulk nails.

Automatic nailing devices often move along a frame via a gantry and are configured to drive nails into pallets located thereunder. Unfortunately, the nailing operation is a somewhat violent and jarring operation that can cause the gantry to "rack" relative to the pallet and become misaligned. This can reduce accuracy of nailing. Downtime for gantry realignment is detrimental to production rates for these automatic nailing devices.

SUMMARY OF THE INVENTION

In view of the foregoing, it is an object of the present invention to provide an automatic pallet fabrication apparatus that eliminates the problems associated with nail driving systems that can utilize bulk nails.

It is also an object of the present invention to provide such an apparatus that utilizes bulk nails.

It is another object of the present invention to provide an automatic pallet fabrication apparatus including an automatic stringer feeding system that can move multiple stringers simultaneously.

It is a further object of the present invention to provide an automatic pallet fabrication apparatus including an automatic nailing system that resists misalignment during operation.

These and other objects are accomplished, according to the present invention, by an apparatus for making pallets which includes an automatic stringer feeding system, an automatic stringer advancing system, a pallet assembly station, a nail delivery system, and a pallet stacking system. Wood stringers are automatically fed to a series of hoppers which facilitate advancing the stringers into the pallet assembly station. Spaced apart deck boards are nailed, via the nail delivery system, to both sides of the supporting base of transversely positioned stringers in the pallet assembly station. Assembled pallets are removed from the apparatus and stacked for use or shipping.

According to one aspect of the present invention, a longitudinally extending frame includes a first pallet assembly area. A gantry, movable along the longitudinally extending frame on generally parallel spaced apart linear guide bearings, includes multiple nailing stations in adjacent spaced relationship. Each of the nailing stations includes a pneumatically driven double ram for nailing together stringers and overlying deck boards positioned within the first pallet assembly area.

In operation, an operator places deck boards transversely across the spaced apart stringers which are automatically fed into the first pallet assembly area from the elongated storage hoppers. The gantry passes continuously over the first pallet assembly area and nails are driven into the underlying deck boards and stringers to form a half-assembled pallet. The gantry reverses its direction and the half-assembled pallet is flipped over into a second pallet assembly area adjacent the first pallet assembly area.

Stringers are advanced automatically from the hoppers into the first pallet assembly area. An elongated bar is configured to push the lowermost stringer in a stack endwise from each respective hopper to the first pallet assembly area. An operator then places deck boards transversely across the stringers in the first pallet assembly area and across the inverted stringers in the second pallet assembly area. The gantry reverses its direction and passes continuously over the second and first pallet assembly areas. Nails are driven into the underlying deck boards and stringers to form a completely-assembled pallet in the second pallet assembly area and a half-assembled pallet in the first pallet assembly area. The gantry reverses its direction and the half-assembled pallet is flipped over into the second pallet assembly area and the completely-assembled pallet is pushed from the second pallet assembly area to a stacking area.

According to another aspect of the present invention, the elongated hoppers are positioned adjacent the first pallet assembly area and are arranged in substantially parallel spaced relationship. Each of the hoppers is configured to hold multiple elongated stringers in an upright stack wherein the stringers are oriented in a substantially horizontal edgewise configuration. Each hopper has a sensor for detecting stringer stack height within the hopper. The sensor is positioned to detect the endwise face height of the stringers within the hopper.

According to another aspect of the present invention, an automatic stringer loading system is provided for loading stringers into each of the hoppers. The hopper loading system is operatively coupled to the sensors on each hopper such that when stack height in a hopper is below a predetermined height, the stringers are automatically loaded into the hopper.

Stringers are provided initially in a stacked array such that the longitudinal axes of the stringers are generally parallel. The hopper loading system includes a first conveying system for conveying a layer of stringers from the stacked array in adjacent substantially horizontal relation along a first direction. An elevating system is provided for elevating the stacked array of stringers to the first conveying system to facilitate removing a stringers from the array one layer at a time.

The hopper loading system also includes a second conveying system for conveying stringers in adjacent substantially horizontal relation to each hopper along a second direction substantially transverse to the first direction. The first and second conveying systems each include at least one elongated bar configured to push the stringers along the respective first and second directions. The first and second conveying systems are operatively coupled such that the first conveying system conveys stringers along the first direction in response to the second conveying system conveying stringers along the second direction.

According to another aspect of the present invention, a gantry position control system is provided for controlling the continuous movement of the gantry along the longitudinally extending frame. A nailing station actuation system operatively coupled with the gantry position control system is provided for causing each of the pneumatically driven rams to nail together underlying deck boards and stringers as the gantry moves continuously along the longitudinally extending frame.

Each bulk nail retaining bin includes a slotted ramp leading from the receiving slot to a respective nailing station. The slotted ramp is configured to deliver nails in a single row to the nailing station. The slotted ramp includes an inclined portion, a flattened end portion adjacent the nailing station, and an arcuate transitional portion between the inclined and flattened end portions. A plurality of retractable pins positioned at the flattened end portion transversely to the slot control entry of each nail into the magnetic chuck. The pins separate the leading nail in the row from the remaining nails in the row.

According to another aspect of the present invention, each nailing station includes a magnetic chuck for receiving a nail from a respective slotted ramp and for holding a nail in position for nailing by the pneumatically driven ram. The magnetic chuck may include at least one rare earth magnet.

According to another aspect of the present invention, a method of making pallets includes conveying a plurality of elongated stringers in adjacent substantially horizontal relation along a first direction, and conveying the elongated stringers in adjacent substantially horizontal relation along a second direction to a hopper. The second direction may be substantially transverse to the first direction. The first direction is generally parallel with a longitudinal axis of each of the elongated stringers.

The present invention is advantageous in that an improved rate of pallet production can be achieved as compared with existing methods of production. The automatic stringer feeding system of the present invention is advantageous over existing stringer handling techniques because the process of pushing multiple stringers along their endwise faces reduces the likelihood of the stringers becoming dislocated.

The use of a dedicated bulk nail supply bowl and delivery system to each nailing station permits increased nail capacity and decreased downtime to resupply nails as compared with systems utilizing single supply bowls. Furthermore, the use of a dedicated bulk nail supply bowl to each nailing station also simplifies the delivery of nails in that delivery is not coordinated between multiple nailing stations.

The pneumatic nailing station of the present invention is advantageous over prior pallet nailing systems in that it can handle bulk nails. Prior systems could not easily handle bulk nails but could handle collated nails. Prior systems were not able to feed and hold bulk nails as quickly as the present invention. Pneumatically driven nailing rams are typically faster than hydraulically driven nailing rams and do not require the nailing gantry to stop at each location where a nail is to be driven into the pallet. As such the nailing gantry can move along its path of travel without pausing, thereby increasing the rate of pallet production.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
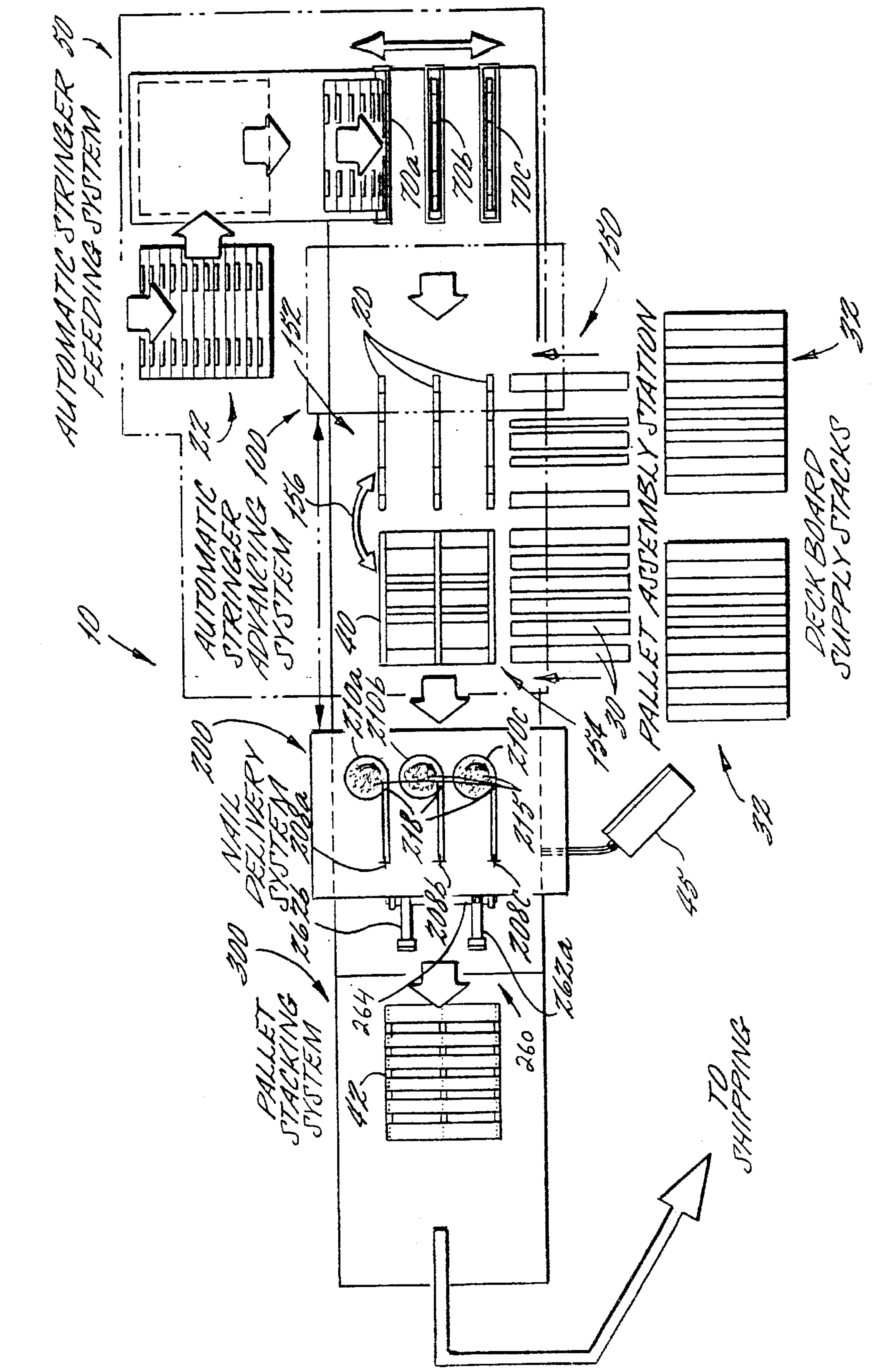
FIG. 1 is a plan view of an automatic pallet making apparatus, according to the present invention.

Referring now to FIG. 1, an apparatus 10 for making wood pallets, according to the present invention, is illustrated. The illustrated apparatus 10 includes an automatic stringer feeding system 50, an automatic stringer advancing system 100, a pallet assembly station 150, a nail delivery system 200, and a pallet stacking system 250. Generally, wood stringers 20 are automatically fed to a series of hoppers 70*a*, 70*b*, 70*c* to facilitate automatic advancement into the pallet assembly station 150. Deck boards 30 are manually placed on the stringers 20 and are nailed, via the nail delivery system 200, to both sides of the stringers 20 in the pallet assembly station 150. Assembled pallets 42 are removed from the apparatus 10 and stacked for use or shipping. Each of the components of the pallet making apparatus 10 will now be described in detail.

Automatic Stringer Feeding System

Figure 2:
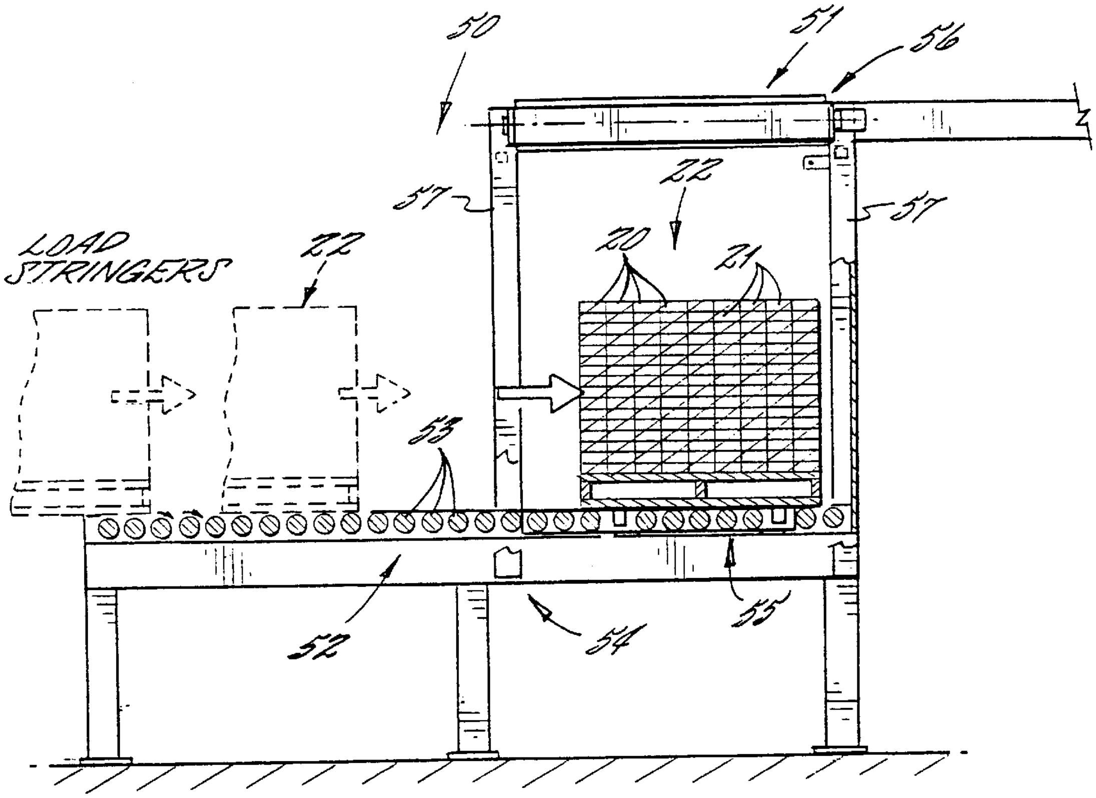
FIG. 2 is an enlarged partial view of the elevating system and first conveyor system of the automatic stringer feeding system of FIG. 1.

The automatic stringer feeding system 50 is illustrated in FIGS. 2–9. The automatic stringer feeding system 50 ensures that a sufficient supply of stringers 20 will be available to the pallet making apparatus 10 for any desired pallet production rate. As illustrated in FIG. 2, the stringers 20 are supplied pre-cut and in a stacked array 22, with each elongated stringer 20 having the same endwise orientation. In the illustrated embodiment, the automatic stringer feeding system 50 includes two conveyor systems 51 and 63 which are utilized to automatically feed stringers to each of the hoppers 70*a*,70*b*,70*c*.

The first conveyor system 51 includes a first conveyor line 52 for conveying the stacked array 22 of stringers 20 to an elevating system 55. The first conveyor line 52 is illustratively and preferably a series of adjacent rollers 53 supported by frame 54 in spaced apart relationship and is configured to allow a stacked array 22 of stringers 20 to roll thereon in a smooth manner. However, as would be understood by those with skill in the art, other types of conveyor lines may be utilized to move a stacked array of stringers without departing from the spirit and intent of the present invention.

Figure 3:
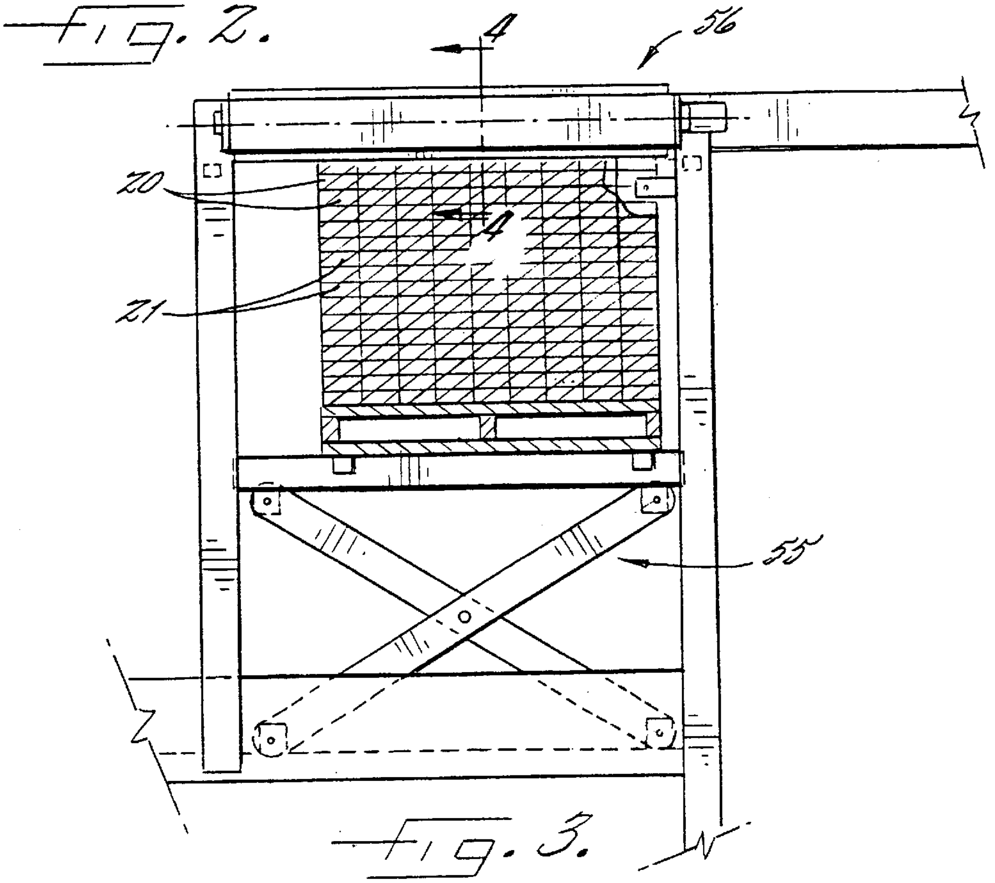
FIG. 3 is an enlarged partial view of the elevating system of the automatic stringer feeding system of FIG. 2.

Referring to FIG. 3, the elevating system 55 comprises a scissors-type lift configured to elevate the stacked array 22 of stringers 20 from the first conveyor line 52 to a first unloading station 56 while maintaining the stringers in a substantially horizontal orientation. The present invention is not limited to the illustrated scissors-lift elevating system 55; other types of elevating systems which are capable of maintaining the stringers 20 in a horizontal configuration so as to prevent them from dislodging from the stacked array 22 may be utilized without departing from the spirit and intent of the present invention.

The elevating system 55 elevates the stacked array 22 of stringers 20 to a first unloading station 56 located above the first conveyor line 52. The elevating system 55 is also configured to incrementally lift the stacked array by a predetermined amount (approximately equal to the thickness of a stringer layer) as each layer of stringers is removed via the first unloading station 56. In the illustrated embodiment, the first unloading station 56 is supported from the frame 54 via a supporting structure 57. As would be understood by those with skill in the art, the frame 54 and supporting structure 57 may have a variety of embodiments and configurations.

Referring now to FIGS. 4–7, operations for unloading stringers 20 from the stacked array 22 via the first unloading station 56 are illustrated. In the illustrated embodiment, the first unloading station 56 includes a pair of endless chains 58*a*, 58*b* in substantially parallel spaced apart relationship which are driven by respective pairs of sprocket wheels 59*a*, 59*b* rotatively mounted to the supporting structure 57. A motor 60 is configured to rotate the sprocket wheel pair 59*b* thereby driving the endless chains 58*a*, 58*b* in a counter-clockwise direction as viewed from FIGS. 4–7.

Figure 4:
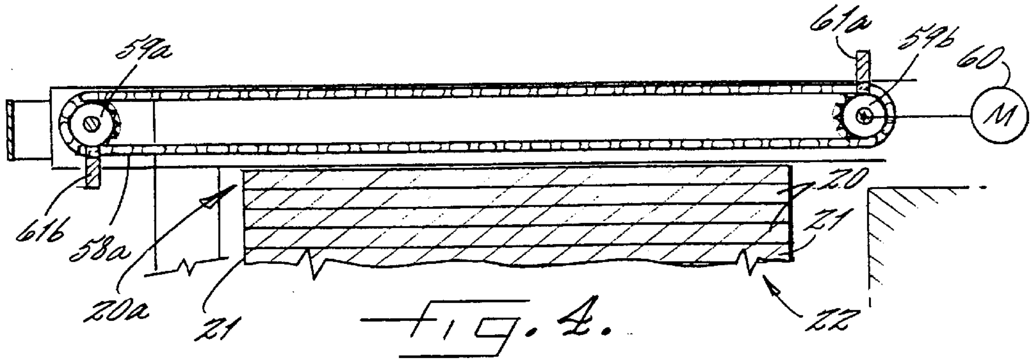
FIG. 4 is a section view taken along lines 4—4 of FIG. 3 which illustrates the first conveyor system of FIG. 2 in position to deliver a layer of stringers from a stacked array to the second conveyor system.

Still referring to FIGS. 4–7, a pair of elongated bars 61*a*, 61*b* are transversely attached to each pair of endless chains 58*a*, 58*b* in spaced apart relationship as illustrated. Each elongated bar 61*a*, 61*b* is configured to push a single layer of stringers 20 via their endwise faces 21 from the uppermost portion of a stacked array 22 along the direction indicated by arrow 23. Each stringer has an endwise face 21 at its opposing longitudinal end portions as illustrated in FIG. 4. The elevating system 55 is controlled to raise the stacked array 22 such that each elongated bar 61*a*, 61*b* only engages a single layer of stringers 20 at a time.

Figure 5:
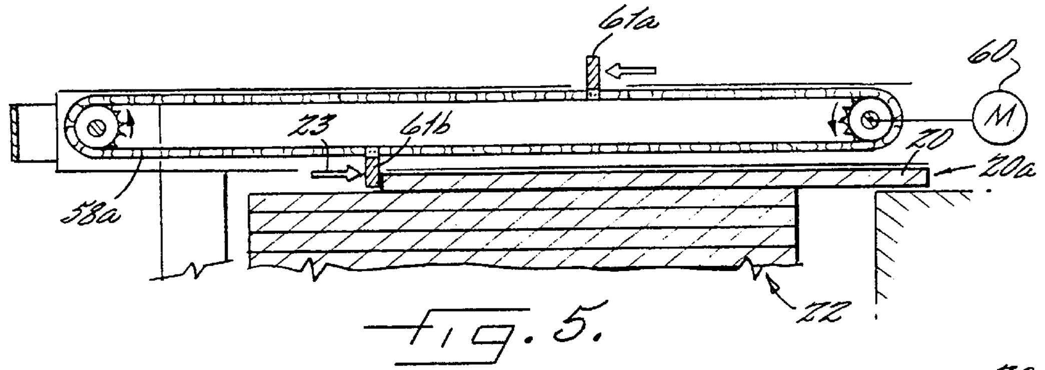
FIGS. 5–7 illustrate the first conveyor system of FIG. 4 as it conveys a layer of stringers to the second conveyor system.
Figure 6:
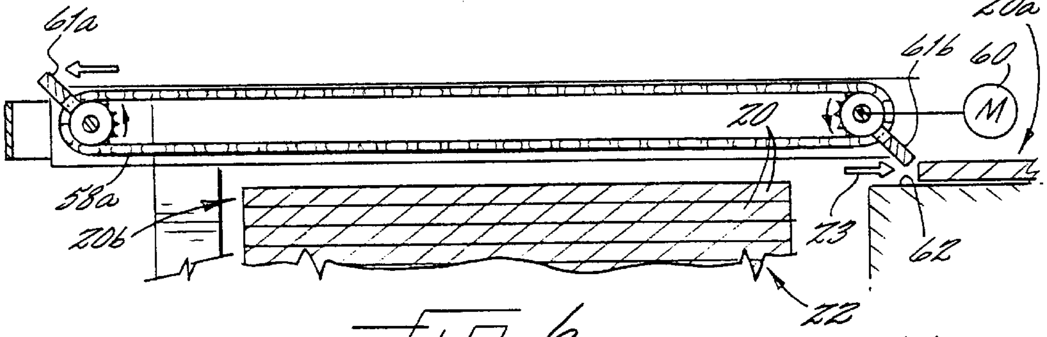
Figure 7:
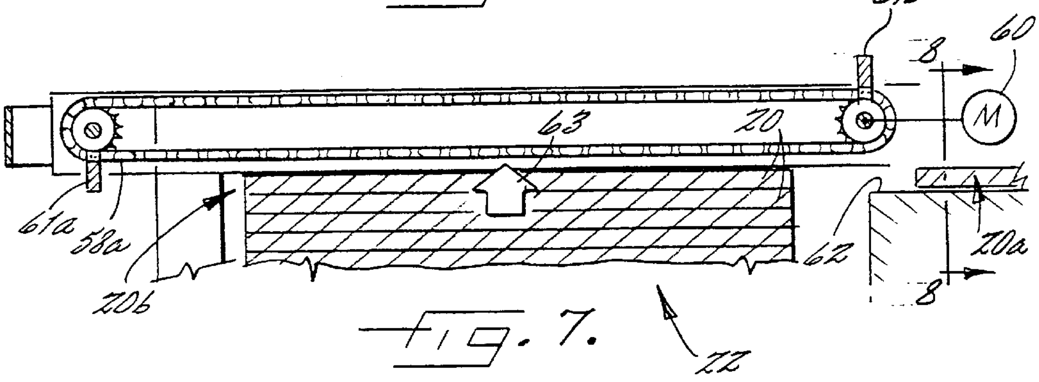

In FIG. 4, the endless chains 58*a*, 58*b* are travelling in a counter-clockwise direction and elongated bar 61*b* is approaching the uppermost layer 20*a* of the stacked array 22 of stringers 20. In FIG. 5, elongated bar 61*b* has engaged the uppermost layer 20*a* of the stacked array 22 and is moving the stringers 20 together along the same direction. In FIG. 6, elongated bar 61*b* has completely pushed the uppermost layer 20*a* of the stacked array 22 onto a receiving surface 62. In FIG. 7, the elevating system 55 has raised the stacked array, by a predetermined amount such that layer 20*b* is now the uppermost layer. Elongated bar 61*a* is approaching the uppermost layer 20*b* of the stacked array 22, and is configured to push it to receiving surface 62. Preferably, the receiving surface 62 has been cleared of stringers from layer 20*a* prior to receiving layer 20*b*, as will be described in detail below. The above process is repeated such that each layer of stringers is removed from the stacked array 22 and pushed to the receiving surface 62. When all layers of stringers have been removed from the stacked array 22, a new stacked array of stringers is provided to the first unloading station 56 via the first conveyor system 51, as described above. The process of pushing the stringers along their endwise faces is advantageous in that the possibility of a "logjam" is less than if the stringers 20 were pushed along their edgewise faces, particularly because the thickness dimension of stringers is typically not tightly controlled.

Figures 8, 9:
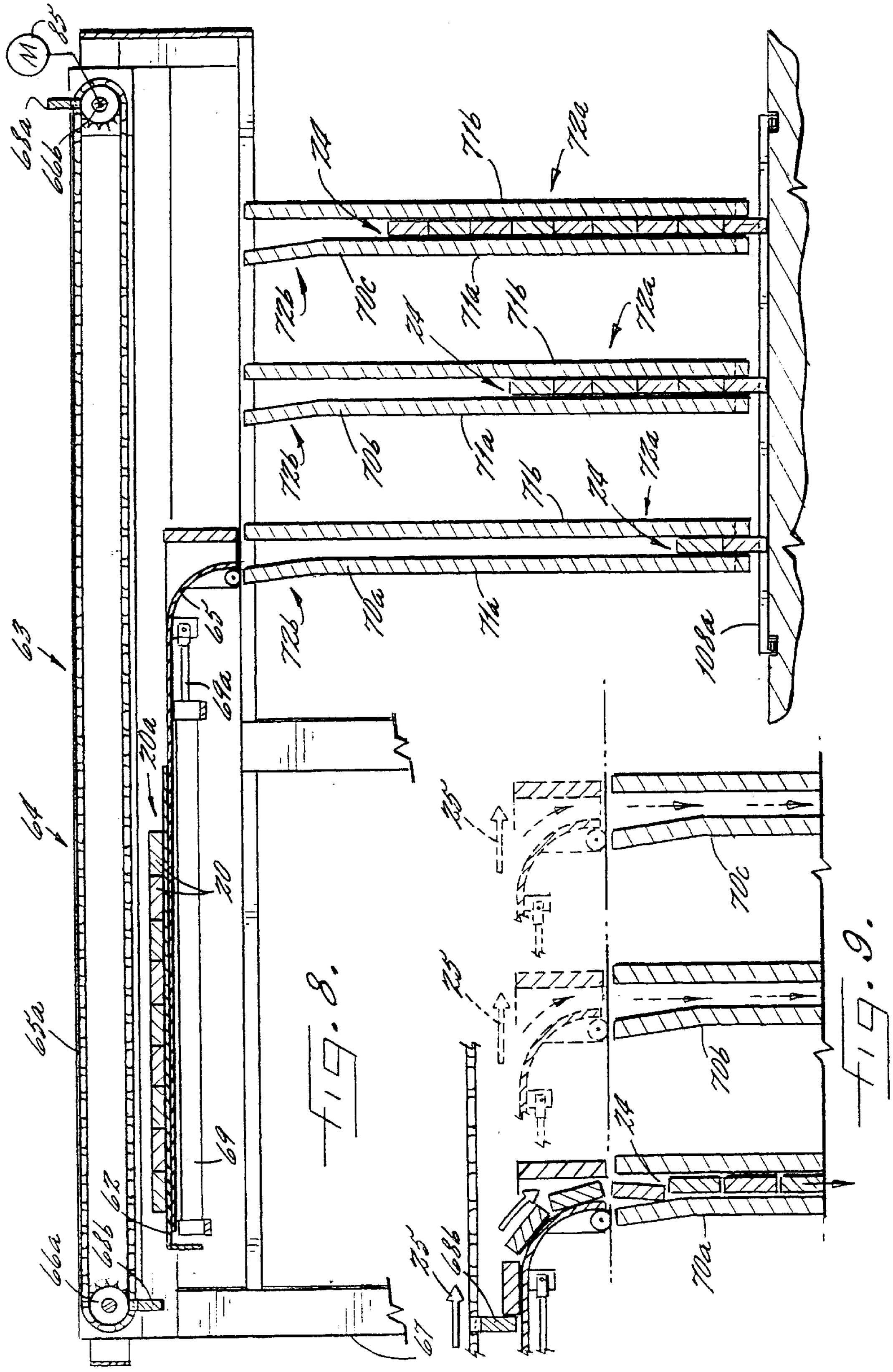
FIG. 8 is a section view taken along lines 8—8 of FIG. 7 illustrating the second conveyor system of the automatic stringer feeding system of FIG. 1 showing the relationship of the stripper system, the hoppers, and the delivery chute.
FIG. 9 is an enlarged partial view of the second conveyor system of FIG. 8 illustrating the movement of the second delivery system to each hopper and the delivery of stringers to a hopper.

Referring now to FIGS. 8 and 9, the second conveyor system 63 is illustrated. The second conveyor system 63 includes a second unloading station 64, the receiving surface 62, which is connected to an extendable chute portion 65, and three hoppers 70*a*, 70*b*, 70*c*. Each of the hoppers 70*a*, 70*b*, 70*c* is configured to hold multiple stringers 20 in a stack 24. As illustrated in FIG. 9, each stack 24 is a single column of stringers 20 in a generally horizontal edgewise relationship, wherein one stringer is directly on top of another stringer.

Each hopper 70*a*, 70*b*, 70*c* is a channel formed by two opposing members 71*a*, 71*b* in substantially parallel spaced relationship along a lower portion 72*a*. In the illustrated embodiment, each hopper 70*a*, 70*b*, 70*c* has a flared upper portion 72*b* wherein opposing members 71*a*, 71*b* are spaced farther apart than in the lower portion 72*a* of each hopper. The flared upper portion 72*b* facilitates loading stringers 20 into each hopper 70*a*, 70*b*, 70*c* from the extendable chute portion 65. The extendable chute portion 65 is configured to communicate with the flared portion 72*b* of each hopper 70*a*, 70*b*, 70*c* as illustrated in FIG. 9, such that stringers pushed edgewise therealong will easily slide or fall into a hopper in an edgewise configuration.

Referring back to FIG. 8, a layer 20*a* of stringers from a stacked array is resting on the receiving surface 62 after having been pushed there via the first unloading station 56. The second unloading station 64 is similar in operation and configuration to the first unloading station 56. The second unloading station 64 includes a pair of endless chains 65*a*, 65*b* in substantially parallel spaced apart relationship which are driven by respective pairs of sprocket wheels 66*a*, 66*b* rotatively mounted to a supporting structure 67. A motor 85 is configured to rotate sprocket wheel pair 66*b* thereby driving the endless chains 65*a*, 65*b* in a counter-clockwise direction as viewed from FIG. 8.

A pair of elongated bars 68*a*, 68*b* are attached transversely to each pair of endless chains 65*a*, 65*b* in spaced apart relationship as illustrated in FIG. 8. Each elongated bar 68*a*, 68*b* is configured to push the row of stringers resting on the receiving surface 62 along a direction (indicated by the arrow in FIG. 9 transverse to that illustrated in FIGS. 4–7 for the first conveyor system 52) to fill a respective hopper 70*a*, 70*b*, 70*c*.

In FIGS. 8 and 9, the row of stringers 20*a* is shown being pushed into hopper 70*a* by the elongated bar 68*b*. Prior to the arrival of elongated bar 68*a* to the illustrated position of elongated bar 68*b* in FIG. 8, the next row of stringers 20*b* will have been pushed onto the receiving surface 62 as described above. Additionally, the extendable chute portion 65 will have moved to the hopper 70*b* before the next row of stringers 20*b* is pushed by the elongated bar 68*a*.

Referring to FIG. 8, a pneumatic cylinder 69 having a movable plunger 69*a* configured to move the extendable chute portion 65 to each respective hopper 70*a*, 70*b*, 70*c*, is illustrated. Preferably, the movable plunger 69*a* of the pneumatic cylinder moves the extendable chute portion 65 in response to signals received from the sensors 80*a*, 80*b*, 80*c* (FIG. 28) located in each respective hopper 70*a*, 70*b*, 70*c* which indicate the height of each stringer stack 24 therewithin. When the height of a stack 24 in a hopper falls below a predetermined level, the extendable chute portion 65 moves to that hopper so that a row of stringers 20 can be delivered thereto.

Any standard off-the-shelf photo eye or other known position detector is an acceptable sensor for monitoring stack height within a hopper. Preferably, each sensor is mounted such that it can view each stringer stack 24 along its endwise direction. This position is advantageous because the position of each stringer in a stack, when viewed endwise (i.e., along the longitudinal axis of the stringer), does not affect the sensor's ability to detect the stringers. Consequently, a stringer may be slightly shorter than the stringer upon which it is resting in the stack without affecting the ability of the sensor to detect it. By contrast, a sensor mounted so as to view a stack along the edgewise faces of the stringers, may be negatively affected by differences in stringer length or location within a hopper.

It is to be understood that the size, configuration and number of hoppers for retaining stringers may vary without departing from the spirit and intent of the present invention. For example, an additional hopper may be added to facilitate production of a four-stringer pallet. The height of each hopper may be varied to increase or decrease the number of stringers retained therewithin. The size and configuration of each hopper may vary to retain stringers having different or non-standard dimensions.

In addition, alternative conveying techniques may be utilized for conveying multiple stringers to each of the hoppers without departing from the spirit and intent of the present invention. The present invention is not limited to the illustrated embodiment wherein multiple chain-driven elongated bars push multiple stringers in various directions.

Control System for Automatic Stringer Feeding System

Figure 28:
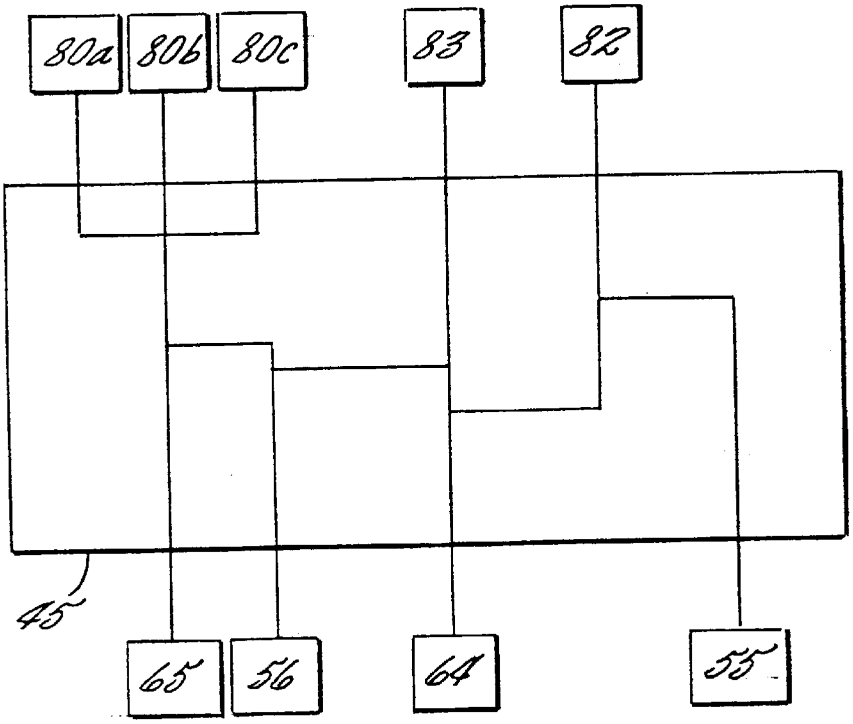
FIG. 28 is a schematic illustration of the control system for controlling the automatic stringer feeding system.

Referring now to FIG. 28 a control system for controlling the automatic stringer feeding system 50 is illustrated. When one of the sensors 80*a*, 80*b*, 80*c* mounted on a respective hopper 70*a*, 70*b*, 70*c* detects that stack height within its respective hopper is below a predetermined level, the controller 45 actuates the first unloading station 56 which moves a layer of stringers from the stacked array 22 onto the receiving surface 62. Detection of low stack height by the sensors 80*a*, 80*b*, 80*c* also causes the extendable chute portion 65 to move into position above the empty hopper. More specifically, the controller 45 actuates the movable plunger 69*a* of the pneumatic cylinder 69 to advance the extendable chute portion 65 to the particular hopper having a low stack height. Preferably, the pneumatic cylinder 69 includes a brake for stopping the movable plunger 69*a* when the extendable chute portion 65 is correctly positioned above a hopper. The acts of moving and stopping the plunger 69*a* are accomplished via a series of pneumatic control valves, as would be understood by those having skill in the art.

The second unloading station 64 is activated by the arrival of one of the elongated bars 61*a*, 61*b* of the first conveyor system 56 to the position of elongated bar 61*b* in FIG. 7. In this position, the sensor 83 detects the elongated bar, which in turn signals the controller 45 to halt the movement of the first conveyor 56 and activate the second unloading system 64. One of the elongated bars 68*a*, 68*b* pushes the stringers on the receiving surface 62 into the desired hopper via one of the elongated bars 68*a*, 68*b*. A proximity switch 82 is positioned to detect the arrival of one of the elongated bars 68*a*, 68*b* in the position of elongated bar 68*a* in FIG. 8. This indicates that the stringers have been pushed into the hopper. At this point, the controller 45 halts the movements of the elongated bars 68*a*, 68*b*. Detection of one of the elongated bars 68*a*, 68*b* by the proximity switch 82 also causes the controller 45 to signal the elevating system 55 to elevate the stack of stringers approximately the thickness of one layer of stringers. This action positions stringers for conveying by the first conveyor system 56 once one of the sensors 80*a*, 80*b*, 80*c* detects that a hopper needs more stringers.

Various additional proximity switches may be positioned in communication with the central controller 45, and may be positioned along both the first and second conveyor systems 51, 63 in predetermined locations. Preferably, these switches are configured to be actuated by the elongated bars 61*a*, 61*b* of the first conveyor system and by the elongated bars 68*a*, 68*b* of the second conveyor system as they travel along their paths as described above. The controller 45 is thereby able to determine the position of each bar via the actuation of these proximity switches. Preferably, the central controller is a standard off-the-shelf programmable logic controller.

Automatic Stringer Advancing System

Figure 10:
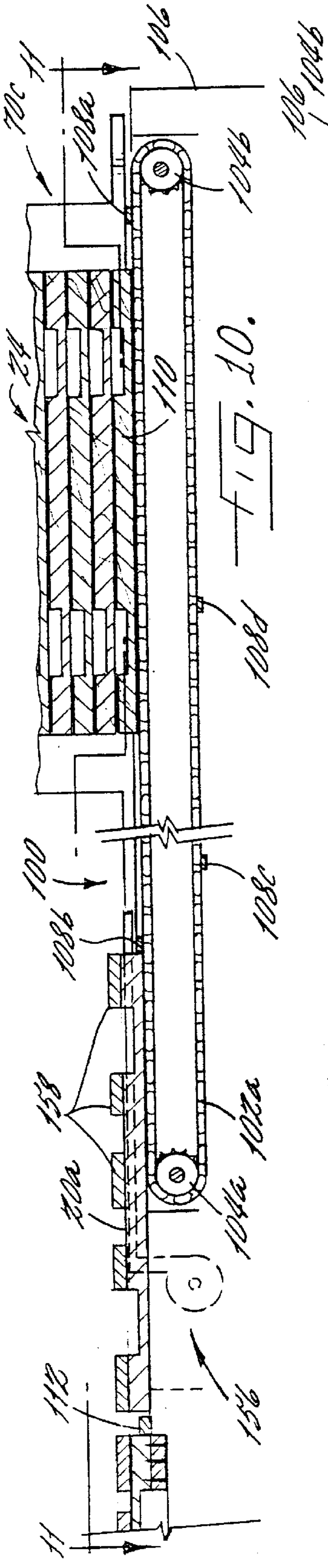
FIG. 10 is an enlarged section view taken along lines 10—10 of FIG. 11 illustrating the automatic stringer advancing system of FIG. 1 for advancing the lowermost stringer from each hopper to the pallet assembly area.
Figure 11:
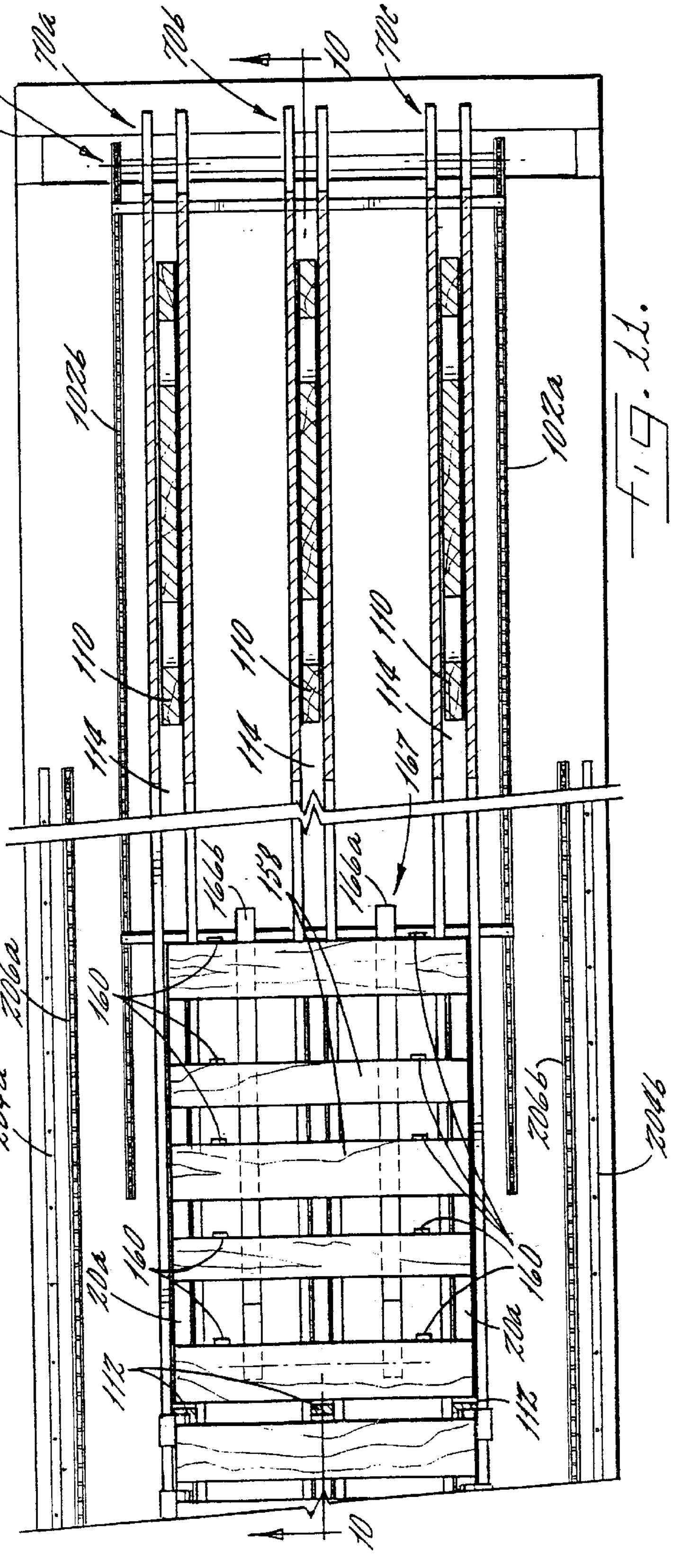
FIG. 11 is an enlarged top section view of the automatic stringer advancing system illustrated in FIG. 1.

Referring now to FIGS. 10 and 11, the automatic stringer advancing system 100 is illustrated. The automatic stringer advancing system 100 includes a pair of endless chains 102*a*, 102*b* in substantially parallel spaced apart relationship which are driven by respective pairs of sprocket wheels 104*a*, 104*b* rotatively mounted to a supporting structure 106. Preferably, a motor (not shown) is configured to rotate sprocket wheel pair 104*b* thereby driving endless chains 102*a*, 102*b* in a counter-clockwise direction as viewed from FIG. 10.

A plurality of elongated bars 108*a*, 108*b*, 108*c*, 108*d* are transversely attached to each pair of endless chains 102*a*, 102*b* in spaced apart relationship as illustrated in FIG. 10. Each elongated bar 108*a*, 108*b*, 108*c*, 108*d* is configured to push the lowermost stringer 110 from each stack 24 in a respective hopper 70*a*, 70*b*, 70*c* into the pallet assembly station 150. Preferably, stops 112 are provided to prevent the stringers from being advanced past the pallet assembly station 150. Additional stops (not shown) are preferably provided to maintain the stringers in proper alignment during pallet assembly.

Preferably, the automatic stringer advancing system 100 is operatively connected with the sensors for detecting stack height within each hopper 70*a*, 70*b*, 70*c*, respectively. Should the height of a stringer stack 24 within any of the hoppers 70*a*, 70*b*, 70*c* fall below a predetermined level, the automatic stringer advancing system 100 becomes inoperative until the automatic stringer feeding system 50 replenishes the respective hopper with stringers, as described above.

Referring to FIG. 11, hoppers 70*a*, 70*b*, 70*c* are spaced apart by the same amount as stringers in an assembled pallet. As a result, the lowermost stringer 110 from each respective hopper 70*a*, 70*b*, 70*c* is delivered to the pallet assembly station 150 in position for assembly without further positioning required. The lowermost stringer 110 slides from each respective hopper into the pallet assembly station 150 via channel 114. Each channel 114 helps maintain a stringer 20 therewithin in proper edgewise alignment for pallet assembly.

The present invention can be modified to fabricate pallets having more than three stringers. In addition, the present invention can be modified to lengthen the channels 114 within which stringers 20 slide to enable the automatic stringer feeding system 50 to be located on the same side of the pallet assembly station 150 as the operator who loads deck boards.

Pallet Assembly Station

Referring back to FIG. 1, the pallet assembly station 150 includes a first pallet assembly area 152, a second pallet assembly area 154, and a pallet inverting system 156. As shown in FIG. 11, deck boards 158 are placed transversely across the upper surface of stringers 20 which are advanced from respective hoppers 70*a*, 70*b*, 70*c* into the first pallet assembly area 151. A series of retainers 160 are provided to facilitate placing the deck boards 158 across the stringers 20 in the proper spaced apart position for assembly. As shown, the deck boards 158 are preferably maintained in a generally parallel spaced apart relationship. The retainers 160 also help maintain the deck boards 158 in proper position during nailing of the deck boards 158 to the stringers 20, which is described in detail below. Typically, a half-assembled pallet fabricated within the first pallet assembly area 152, then is inverted into the second pallet assembly area 154 so that deck boards can be applied to the other side of the pallet.

Figure 12:
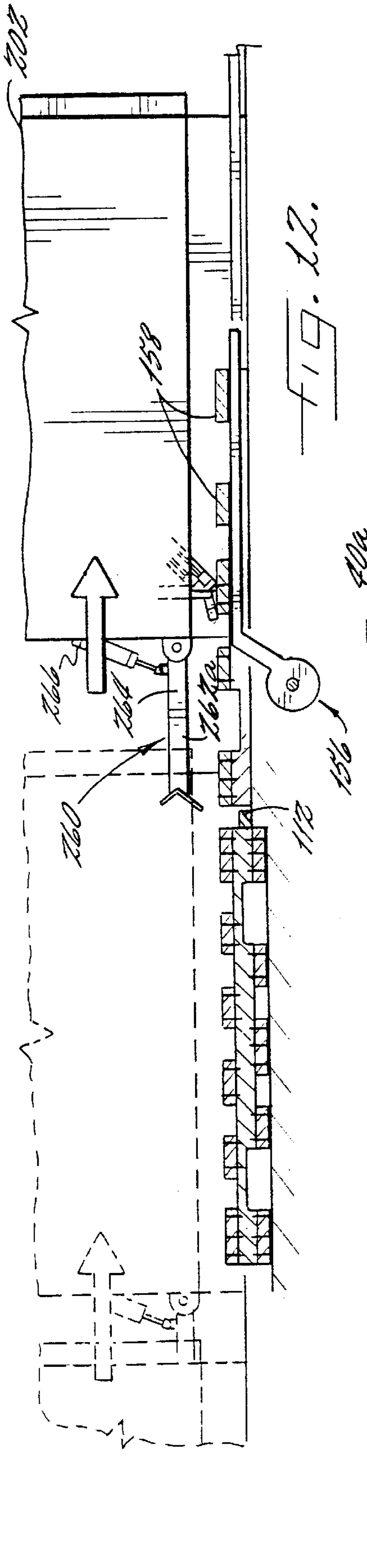
FIG. 12 is an enlarged side view of the pallet assembly station of FIG. 1 illustrating the direction of travel of the nailing gantry over the first and second pallet assembly areas.
Figure 13:
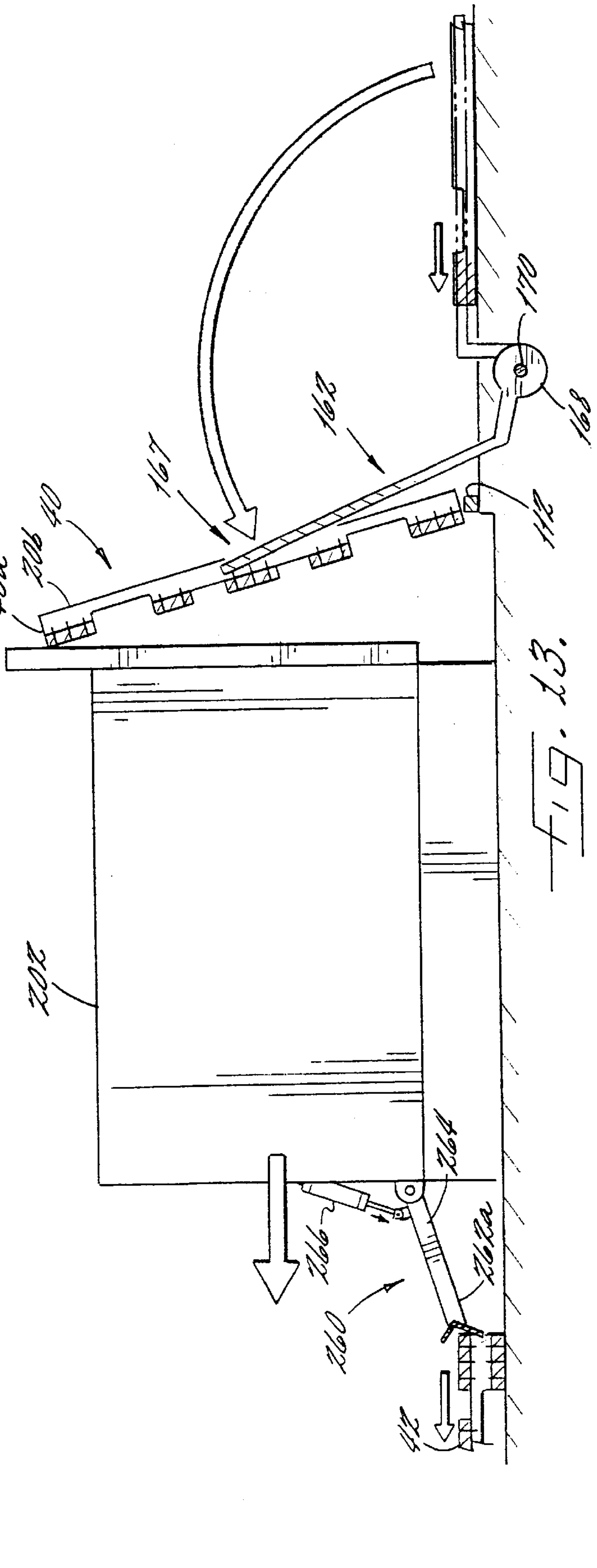
FIG. 13 is an enlarged side view of the pallet assembly station of FIG. 1 illustrating the inverting system for moving a half-assembled pallet from the first pallet assembly area to the second pallet assembly area.

Referring now to FIGS. 12 and 13, the pallet inverting system 156 includes a pivotally mounted lifting fork 162 for transferring a half-assembled pallet 40 from the first pallet assembly area 152 to the second pallet assembly area 154. In the illustrated embodiment, the lifting fork 162 includes two co-planar arms 166*a*,166*b* (FIG. 11) in spaced apart relationship. Each of the co-planar arms 166*a*,166*b* has a respective free end 167 and an opposite end 168 that is pivotally mounted to a shaft 170. In the deactivated position, illustrated in FIG. 12, co-planar arms 166*a*,166*b* are configured to reside between the stringer channels 114 so as not to interfere with either the elongated bars 108*a*, 108*b*, 108*c*, 108*d* that push the stringers into the first pallet assembly area 152, or with the deck boards 158 placed transversely across the stringers. In the activated position, illustrated in FIG. 13, co-planar arms 166*a*,166*b* are pivoted from the deactivated position up to an angle of about ninety degrees (90°). The momentum causes the half-assembled pallet 40 to flip over into the second pallet assembly area 154. Also, it is preferred that the shaft 170 is rotated via an pneumatic cylinder (not shown), which causes the lifting fork to pivot as illustrated in FIG. 13. Preferably, the inverting system 156 is under automated control and operates synchronously with the automatic stringer advancing system 100 and the nail delivery system 200.

In FIG. 13, the movement and inversion of a half-assembled pallet 40 between the first and second pallet assembly areas 152, 154 is illustrated. The nailing gantry 202, described in detail below, is shown moving in a direction (indicated by the arrow in FIG. 13) away from the first and second pallet assembly areas 152, 154. The lifting fork 162 raises one end 40*a* of the half-assembled pallet such that it falls against the moving nailing gantry 202. As the nailing gantry 202 continues along the direction indicated by arrow 164, the half-assembled pallet 40 falls into the second pallet assembly area 154. As illustrated in FIG. 13, the stops 112 facilitate the inverting operation of a half-assembled pallet 40 between the first and second pallet assembly areas 152, 154 by serving as pivot points.

The lifting fork 162 inverts the half-assembled pallet 40 such that the deck boards nailed to the upper surface 20*a* of the stringers 20 in the first pallet assembly area 152 are facing downwardly within the second pallet assembly area 154. Once positioned within the second pallet assembly area 154, deck boards 158 are placed transversely across the upwardly facing surface of the stringers 20. Preferably a series of retainers (not shown) are provided to facilitate placing the deck boards 158 across the stringers 20 in the proper position for assembly. The deck boards 158 are preferably maintained in a generally parallel spaced apart relationship during nailing of the deck boards to the stringers.

Nail Delivery System

Referring now to FIGS. 12–21, the nail delivery system 200 includes a nailing gantry 202 movable along a pair of generally parallel, spaced apart linear tracks 204*a*, 204*b*. The nailing gantry 202 is movable along the linear tracks 204*a*, 204*b* via a pair of endless chains 206*a*, 206*b* in substantially parallel spaced apart relationship which are driven by respective pairs of sprocket wheels (not shown) rotatively mounted to the supporting structure 106. Preferably, a motor (not shown) is configured to rotate the sprocket wheel pairs in both a clockwise and counter-clockwise direction, thereby allowing the nailing gantry 202 to move in both directions along the linear tracks 204*a*, 204*b*.

Figure 27:
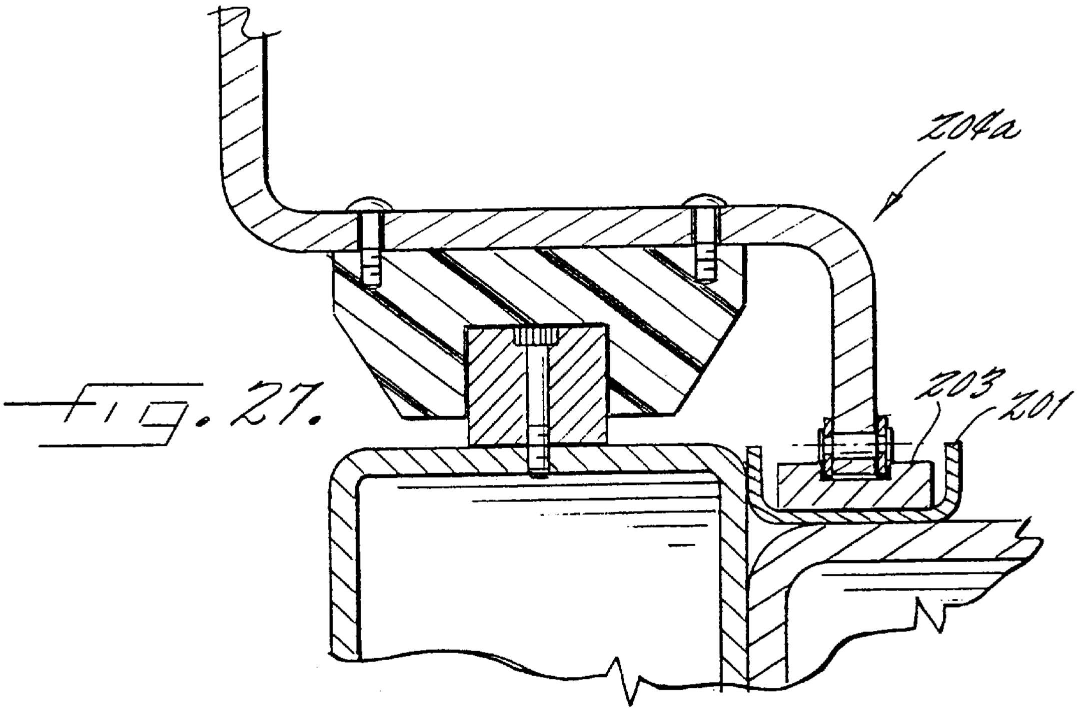
FIG. 27 is an enlarged end view of a linear bearing along which a portion of the nailing gantry travels.

Referring to FIG. 27, a portion of a linear guide bearing 204*a*, 204*b* is illustrated. Each linear guide bearing includes a track 201 and a bearing pad 203 in slidable communication therewith. In this configuration, the gantry is less prone to racking during nailing then prior systems.

In the illustrated embodiment, the nailing gantry 202 includes three nailing stations 208*a*, 208*b*, 208*c* in spaced apart relationship, a bulk nail retaining bin 210*a*, 210*b*, 210*c* for each respective nailing station, and a bulk nail delivery system 212*a*, 212*b*, 212*c* for delivering bulk nails 213 from each bin to each respective nailing station. Each of the respective nailing stations 208*a*, 208*b*, 208*c* is positioned on the nailing gantry 202 to overlie one of the stringer channels 114 in the first pallet assembly area 152. As the nailing gantry moves along its linear tracks 204*a*, 204*b* each nailing station 208*a*, 208*b*, 208*c* moves directly above a respective stringer 20. At each location where a deck board 158 lies transversely across a stringer, the nailing gantry 202 drives one or more nails into the deck board 158 and stringer 200 via each respective nailing station 208*a*, 208*b*, 208*c*. When a half-assembled pallet 40 is inverted into the second pallet assembly area 154, it is automatically locked into position via a series of stops (not shown) such that the nailing stations on the nailing gantry 202 are in proper alignment to nail deck boards placed transversely across the stringers.

The nailing gantry 202 is controlled via the controller 45 which directs each nailing station 208*a*, 208*b*, 208*c* to drive nails based on the position of the nailing gantry as it moves along its linear guide bearings 204*a*, 204*b*. The pneumatically operated nailing stations are advantageous because the nailing gantry 202 does not have to pause at each location where a nail is to be driven, but instead can move continuously during nailing. As a result, production rates are greater than those achievable with conventional hydraulically-operated nailing stations. Furthermore, the various problems associated with the use of hydraulically operated nailing stations are avoided. In particular, no hydraulic fluid is required, which tends to be somewhat messy and to require regular maintenance to prevent leaks and other problems.

Referring back to FIG. 1, each bulk nail retaining bin 210*a*, 210*b*, 210*c* includes a bowl 214 configured to hold bulk nails. A preferred bowl 214 is described in U.S. Pat. No. 4,867,364 to Wallin et al., the disclosure of which is incorporated herein by reference in its entirety. Preferably, the retaining bins 210*a*, 210*b*, 210*c* combined hold around fifty pounds (50 lbs.) of bulk nails.

Figure 14:
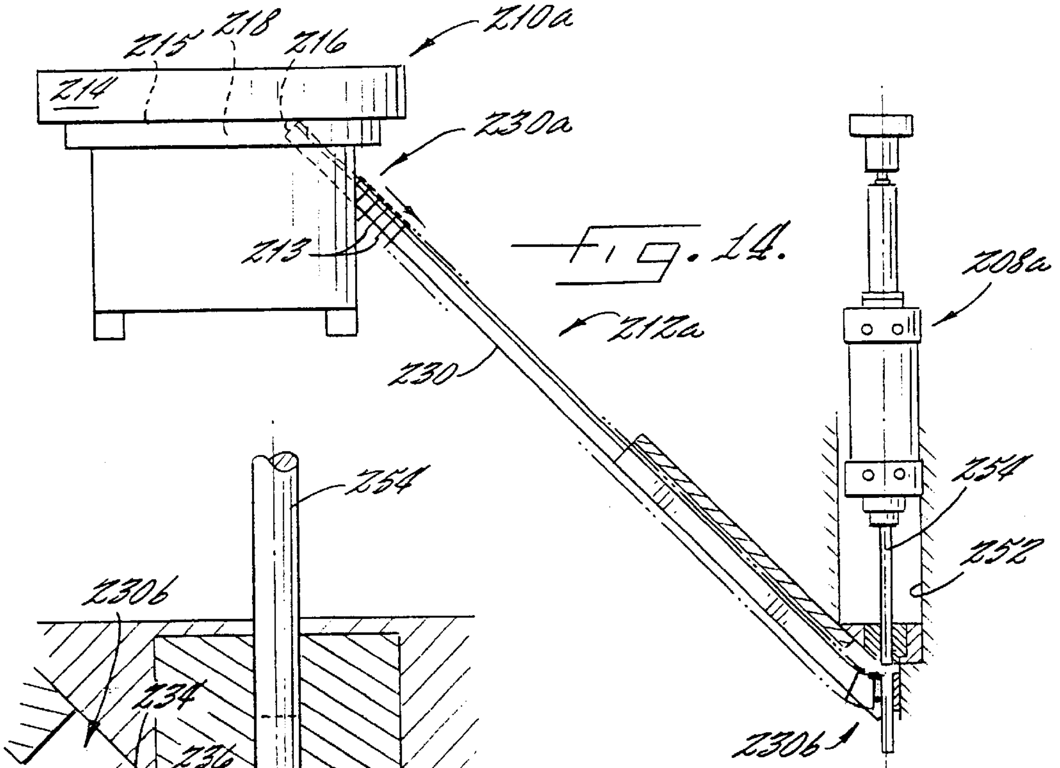
FIG. 14 is an enlarged side view of the bulk nail retaining bin, delivery system, and pneumatic nailing system of FIG. 1.

Referring to FIG. 14, an arcuate ledge 215 extends around an inside portion of each respective bowl 214. A slot 216 extends from one end 218 of the arcuate ledge 215 and is configured to receive nails therein. In operation, the bowl 214 is subjected to vibration which causes the bulk nails 213 therewithin to become aligned and move along the arcuate ledge 215. The nails 213 become engaged within the slot 216 at an arcuate ledge end 218. The nails 213 are organized into a single row with their shanks pointing downwardly through the slot 216. The slot 216 is not as wide as the head 220 of each nail 213 so that each nail is supported via its head as illustrated in FIG. 14.

Figure 15:
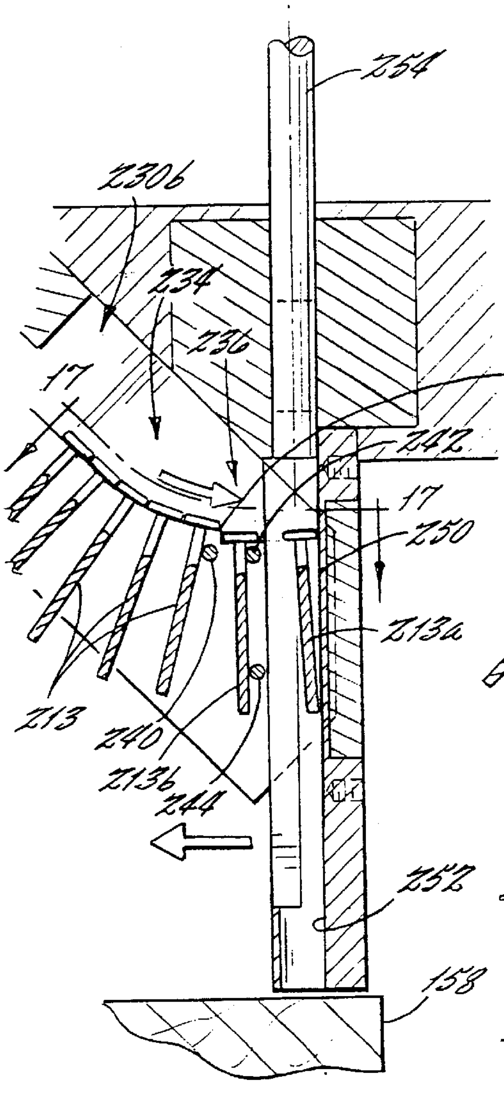
FIGS. 15–16 are greatly enlarged side section views of the nailing system of FIG. 14 illustrating operations for loading a bulk nail into a nailing station, holding the bulk nail via a magnetic chuck, and pneumatically driving the nail into a pallet.
Figure 16:
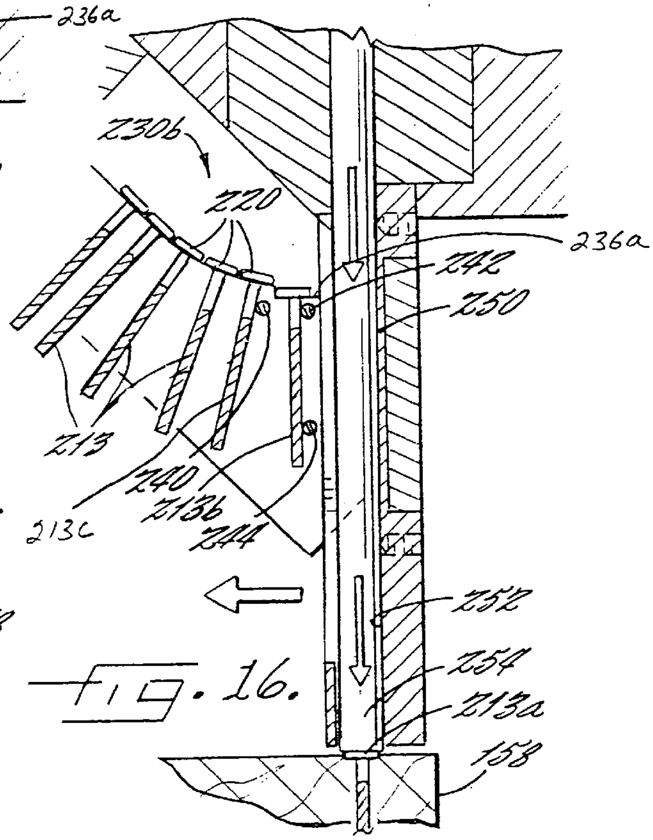

Referring now to FIGS. 14–16, each respective bulk nail delivery system 212*a*, 212*b*, 212*c* is illustrated in detail. A ramp 230, having a slot 232 therein, extends from each bowl 214 to each respective nailing station 208*a*, 208*b*, 208*c*. A portion 232*a* of the slot 232 in the upstream end 230*a* of each ramp 230 is in communication with the nail receiving slot 216 extending from each respective bowl 214. A portion 232*b* of the slot 232 in the downstream end portion 230*b* of each slotted ramp 230 is in communication with a magnetic chuck 250 of each respective nailing station 208*a*, 208*b*, 208*c*.

Bulk nails 213 leave each respective bowl 214 via slot 216 organized into a single row with the shank of each nail extending downwardly through the slot 216 as described above. The bulk nails 213 continue in this single row configuration from slot 216 to slot 232 and downwardly to a respective nailing station 208*a*, 208*b*, 208*c*. As illustrated in FIGS. 14–16, the ramp 230 has a generally constant downwardly incline to the downstream end portion 230*b*. The downstream end portion 230*b* includes an arcuate transitional section 234 and a flattened end portion 236. The flattened end portion 236 facilitates controlling the delivery of bulk nails 213 to the magnetic chuck 250 at high production rates. The flattened end portion 236 permits each nail 213 to become vertically oriented prior to entering the chuck 250. According to another embodiment of the present invention, the flattened end portion 236 may include a recessed portion 236*a* for receiving each nail prior to entering into the chuck 250.

In the illustrated embodiment of FIGS. 15 and 16, the flattened end portion 236 includes three control pins 240, 242, 244 for feeding bulk nails 213 to the chuck 250 one at a time. In FIG. 15, a nail 213*a* is positioned within the chamber 252 of the nailing station 208*a* by the magnetic chuck 250. The nail 213*b* next in position to enter the chamber 252 is restrained by control pins 240, 242, 244. Upon nail 213*a* being discharged from the chamber via a ram 254 of the nailing station, the control pins 240, 242, 244 are actuated to allow the nail 213*b* to become positioned within the chamber 252 and to restrain the next nail 213*c*.

Figure 17:
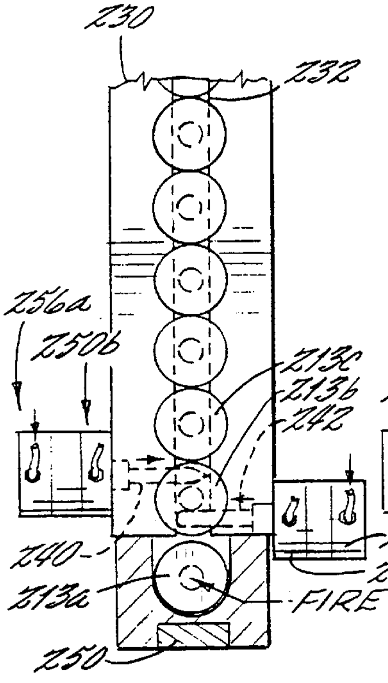
FIGS. 17–21 are greatly enlarged plan views of the nailing system of FIG. 14 illustrating the actuation sequence of control pins used to feed bulk nails to the magnetic chuck within the nailing station.
Figure 18:
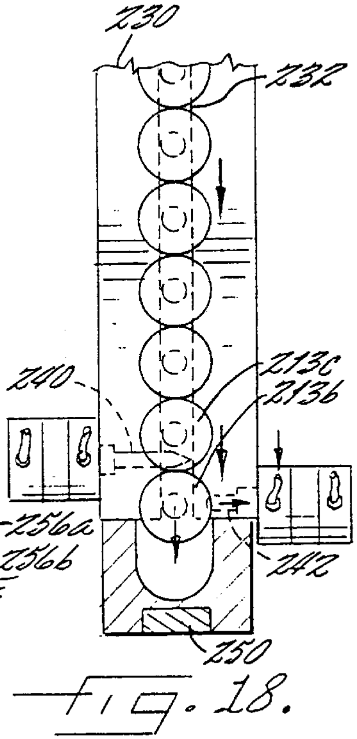
Figure 19:
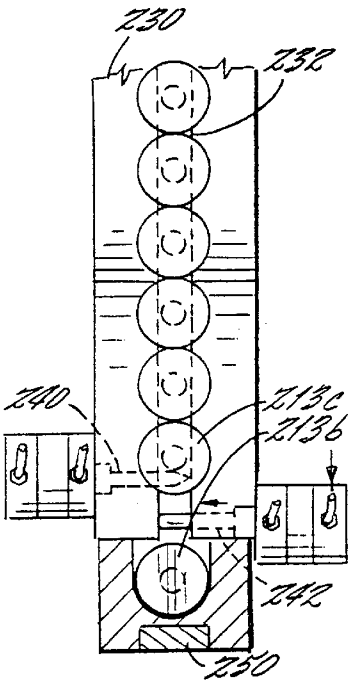
Figure 20:
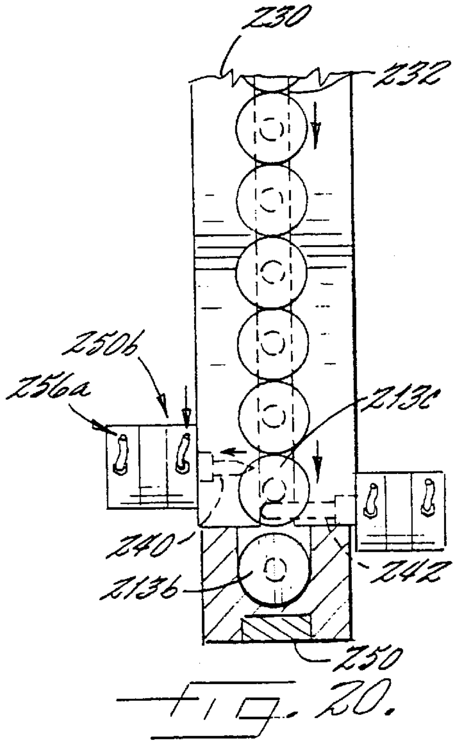
Figure 21:
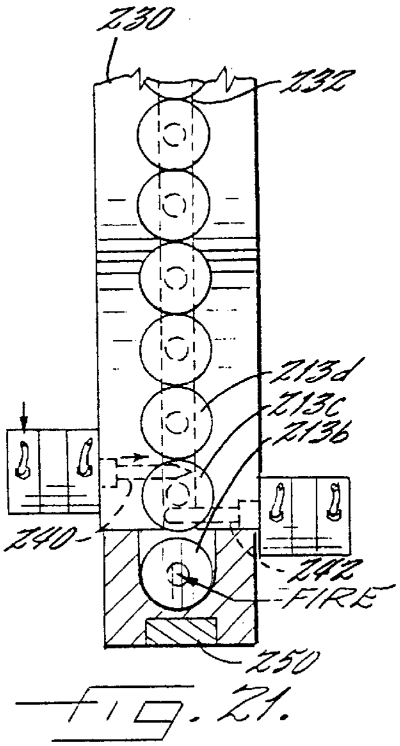

The actuation sequence of control pins 240, 242, 244 is illustrated in FIGS. 17–21. Referring initially to FIG. 17, the nail 213*a*, held within the chamber 252 via the magnetic chuck 250, is being driven into a pallet via the ram 254. Control pins 240, 242 and 244 (not shown) are fully extended as illustrated to restrain nail 213*b* from entering the chamber 252 prematurely. In FIG. 18, control pins 242, 244 are retracted, allowing the nail 213*b* to be pulled into and retained within the chamber 252 via the magnetic chuck 250. In FIG. 19, control pins 242, 244 are extended after the nail 213*b* enters the chamber 252 to restrain further entry into the chamber. In FIG. 20, the control pin 240 is retracted to allow the nail 213*c* to be next in the queue. In FIG. 21, the control pin 240 is extended to restrain the nail 231*d* from interfering with the nail 213*c*. The control pins 242, 244 remain fully extended while the nail 213*b* is driven into a pallet.

Preferably, the control pins 240, 242, 244 are pneumatically operated with the activation sequence under the control of the controller 45 (FIG. 1). Pneumatic lines for causing the control pins 240, 242, 244 to extend and retract are illustrated in FIGS. 17–21 as 256*a*, 256*b* respectively.

Referring back to FIG. 14, each nailing station 208*a*, 208*b*, 208*c* includes a pneumatically driven ram 210 operably engaged within a chamber 252. Included within the chamber 252 and adjacent ramp end portion 230*b* is a rare earth magnetic chuck 250 configured to hold a bulk nail in proper position for driving into a pallet via the ram 210. Preferably, each ram 210 is of a "double ram" configuration to provide extra mass needed to pneumatically drive the bulk nails into a pallet.

Referring back to FIGS. 12 and 13, attached to the nailing gantry 202 is a pallet removal device 260 for pushing completed pallets from the pallet assembly station 150 to the pallet stacking system 300. The device 260 includes a pair of generally co-planar spaced apart arms 262*a*, 262*b* pivotally attached to the nailing gantry via frame member 264. Each arm 262*a*, 262*b* has an end portion 265 configured to engage an edge portion of an assembled pallet. An actuator arm 266 is connected to the frame member 264 and to the nailing gantry 202.

The actuator arm 266 is configured to push downwardly on the frame member 264 of the pallet removal device 260 when the nailing gantry 202 is moving in the direction indicated by arrow 164. In operation, nailing gantry 202 moves along its linear guide bearings 204*a*, 204*b* (FIG. 27) in the direction indicated by the arrows in FIG. 12 and nails are driven into pallets positioned within both the first and second pallet assembly areas 152, 154. When nailing operations are complete, the nailing gantry 202 reverses its direction of travel and moves along its linear guide bearings 204*a*, 204*b* in the direction indicated by arrow 164.

Pallet Stacking System

Figure 22:
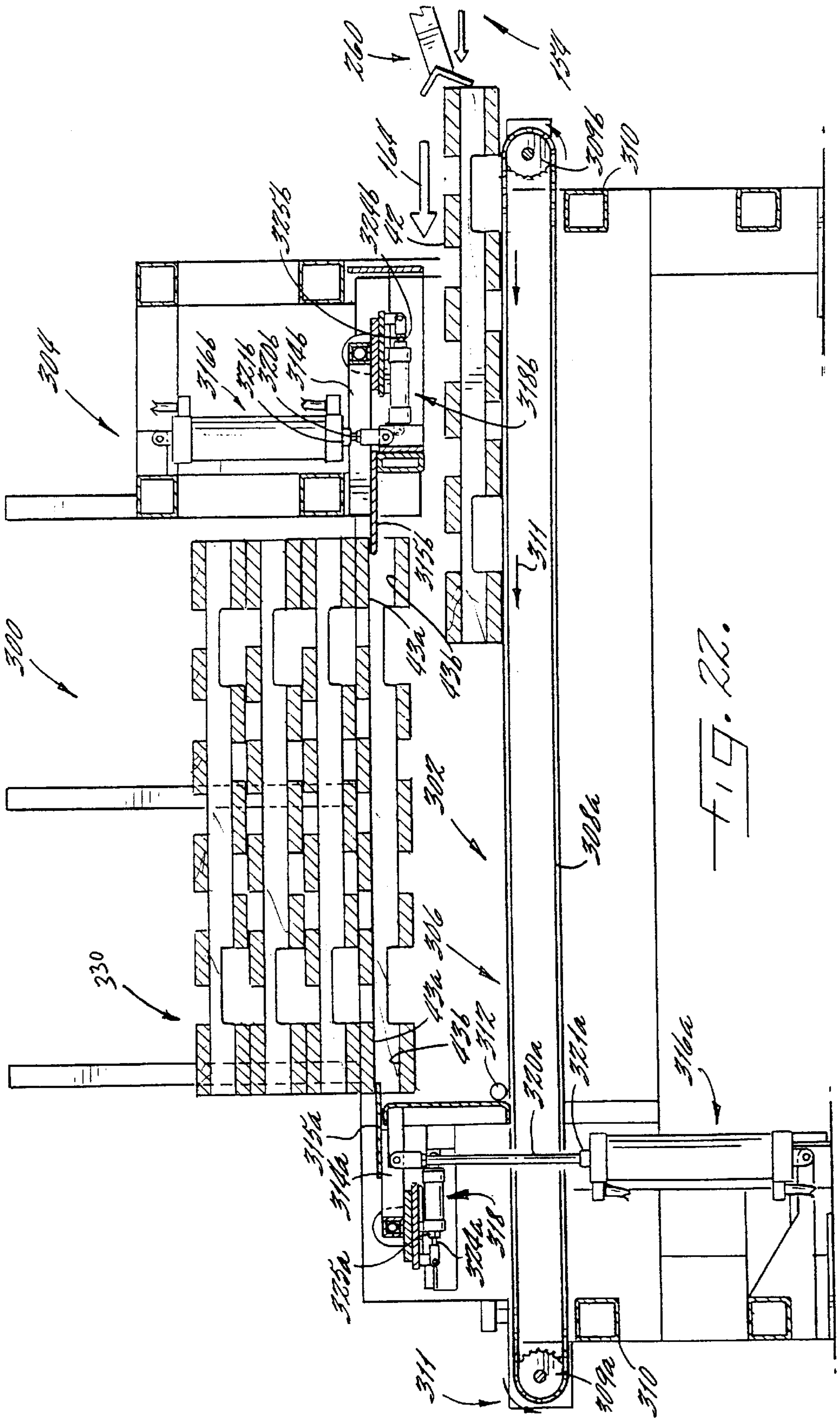
FIG. 22 is an enlarged side view of the pallet stacking system of FIG. 1.

Referring now to FIG. 22, the pallet stacking system 300, which arranges assembled pallets into a vertical stack, includes a pallet conveying system 302 and a pallet lifting system 304. The pallet stacking system 300 is an "in-line" ejection system wherein assembled pallets are removed from the second pallet assembly area 154, stacked, and removed as a stack along a generally linear path. The in-line configuration is advantageous because less space is required for pallet stacking and removal than with multi-directional removal systems.

In the illustrated embodiment, the pallet conveying system 302 includes a conveyor 306 driven via a pair of endless chains 308*a*, 308*b* in substantially parallel spaced apart relationship which are driven by respective pairs of sprocket wheels 309*a*, 309*b* rotatively mounted to the supporting structure 310. Preferably, a motor (not shown) is configured to rotate the sprocket wheel pairs 309*a*, 309*b* in the direction indicated by the arrows in FIG. 22 to convey assembled pallets from the second pallet assembly area 154 (in the direction indicated by the arrow).

The pallet lifting system 304 includes a pair of generally co-planar lifting arms 314*a*, 314*b* in opposing spaced apart relationship. In the illustrated embodiment, each lifting arm 314*a*, 314*b* includes a generally flat horizontal lifting plate 315*a*, 315*b* which is configured to be inserted between the upper and lower deck portions 43*a*, 43*b* of an assembled pallet. Each respective lifting arm 314*a*, 314*b* is operatively coupled with a first pneumatic cylinder 316*a*, 316*b* for raising and lowering a respective lifting arm while maintaining each respective lifting plate 315*a*, 315*b* in a generally horizontal plane. Each respective lifting arm 314*a*, 314*b* is also operatively coupled with a second pneumatic cylinder 318*a*, 318*b* for moving a respective lifting arm in a horizontal direction. Preferably, each of the pneumatic cylinders 316*a*, 316*b*, 318*a*, 318*b*, are controlled via a series of valves actuated via the controller 45.

As illustrated in FIG. 22, the first pneumatic cylinder 316*a* operatively coupled with the lifting arm 314*a* has a movable plunger 320*a* that extends upwardly out of its retaining cylinder 321*a* to cause the lifting arm 314*a* to be raised upwardly. In contrast, the first pneumatic cylinder 316*b* operatively coupled with the lifting arm 314*b* has a movable plunger 320*b* that extends upwardly into its retaining cylinder 321*b* to cause the lifting arm 314*b* to be raised upwardly. The present invention is not limited to the illustrated operation and orientation of the first pneumatic cylinders 316*a*, 316*b*. Other configurations may be utilized without departing from the spirit and intent of the present invention.

Still referring to FIG. 22, each respective second pneumatic cylinder 318*a*, 318*b* has a respective movable plunger 324*a*, 324*b* that extends horizontally into a respective retaining cylinder 325*a*, 325*b* to cause each respective lifting plate 315*a*, 315*b* to be inserted between the upper and lower deck portions 43*a*, 43*b* of an assembled pallet. Similarly, each movable plunger 324*a*, 324*b* extends horizontally outwardly from its respective retaining cylinder 325*a*, 325*b* to cause a respective lifting plate 315*a*, 315*b* to be removed from between the upper and lower deck portions 43*a*, 43*b* of an assembled pallet.

Preferably, both second pneumatic cylinders 318*a*, 318*b* are controlled in tandem by the controller 45 such that each respective lifting plate 315*a*, 315*b* is inserted between (and removed from between) the upper and lower deck portions 43*a*, 43*b* of opposite sides of an assembled pallet substantially at the same time. Preferably, both first pneumatic cylinders 316*a*, 316*b* are controlled in tandem by the controller 45 such that both lifting arms 314*a*, 314*b* are moved in the same direction (upwardly or downwardly) in unison.

In operation, an assembled pallet 42 is pushed onto the pallet conveying system 302 from the second pallet assembly area 154 via the pallet removal device 260. Preferably, the pallet conveying system 302 is controlled via the controller 45 such that the conveyor 306 conveys the pallet 42 up to the stop 312 located adjacent the lifting arm 318*a*. When the assembled pallet 42 reaches the stop 312, the conveyor is halted so that the pallet lifting system 304 can lift the pallet above the conveyor 306. Once the assembled pallet 42 is lifted above the conveyor 306, the conveyor is started again to convey the next pallet removed from the second pallet assembly area 154 to the stop 312.

Figure 23:
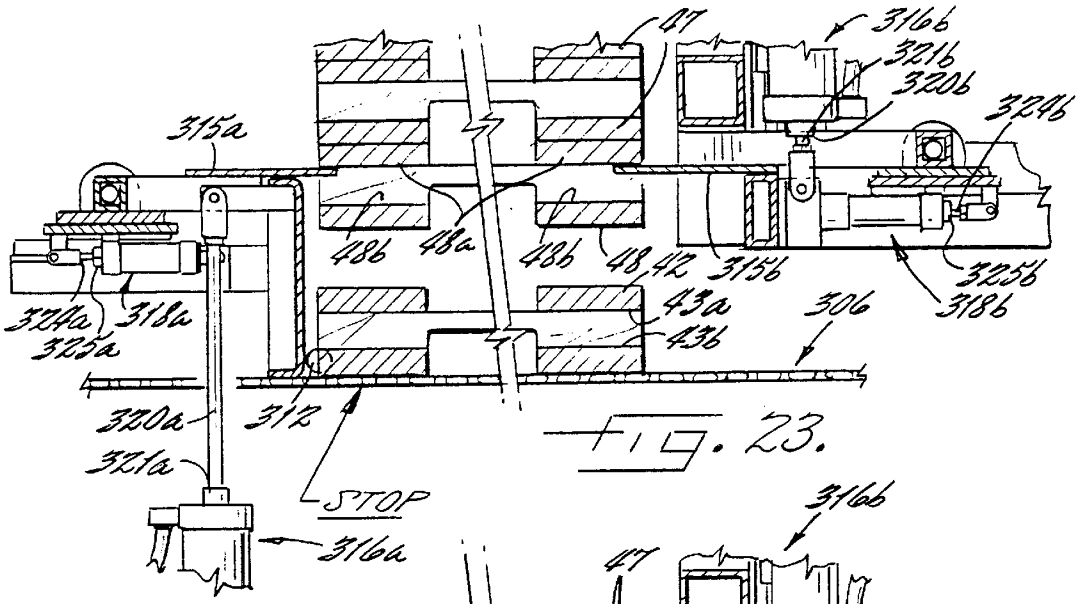
FIGS. 23–26 are greatly enlarged side section views of the pallet stacking system of FIG. 22 illustrating operations for stacking fabricated pallets.

Referring now to FIGS. 23–26, operations of the pallet stacking system 300 are illustrated. In FIG. 23, an assembled pallet 42 has been conveyed via the conveyor 306 to a position abutting the stop 312. Suspended above the assembled pallet 42 are a plurality of assembled pallets 47 stacked on top of a bottommost pallet 48. The bottommost pallet 48 is supported above the assembled pallet 42 via the lifting plates 315*a*, 315*b* which are inserted between the upper and lower deck portions 48*a*, 48*b* of opposite sides of the bottommost pallet. The stack of pallets 47, 48 are supported in a generally horizontal position to prevent one or more pallets from falling from the stack. As illustrated, the plunger 320*a* of the first pneumatic cylinder 316*a* is extended outwardly from its retaining cylinder 321*a* to raise lifting arm 314*a*. In contrast, the plunger 320*b* of the second pneumatic cylinder 316*b* is retracted inwardly into its retaining cylinder 321*b* to raise lifting arm 314*b*.

Figure 24:
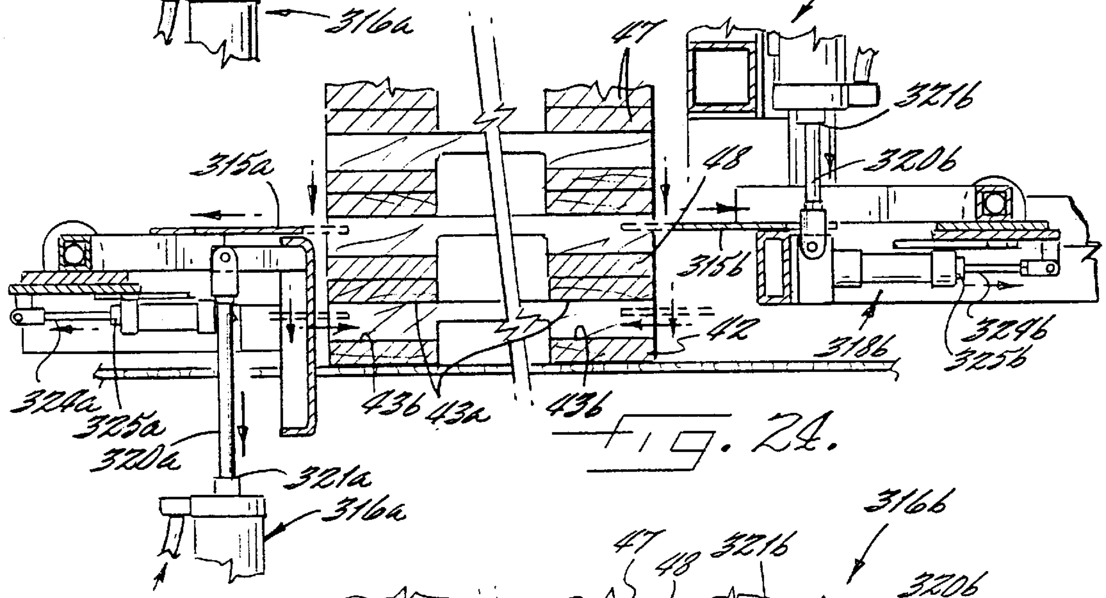

Referring now to FIG. 24, the plunger 320*a* of the first pneumatic cylinder 316*a* has been retracted inwardly into its retaining cylinder 321*a* and the plunger 320*b* of the second pneumatic cylinder 316*b* has been extended outwardly from its retaining cylinder 321*b*. The combined movement of both plungers 320*a*, 320*b* lowers lifting plates 315*a*, 315*b* which causes the stack of pallets 47, 48 to move downwardly on top of assembled pallet 42.

Next, each respective lifting plate 315*a*, 315*b* is retracted from between the upper and lower deck portions 48*a*, 48*b* of opposite sides of the pallet 48 by extending the plungers 324*a*, 324*b* outwardly from their retaining cylinders 325*a*, 325*b*. Next, each respective lifting plate 315*a*, 315*b* is moved downwardly by retracting plunger 320*a* further into its retaining cylinder 321*a*, and by extending plunger 320*b* further outwardly from its retaining cylinder 321*a*. Next, each respective lifting plate 315*a*, 315*b* is inserted between the upper and lower deck portions 43*a*, 43*b* on opposite sides of the pallet 42 by retracting the plungers 324*a*, 324*b* inwardly into their respective retaining cylinders 325*a*, 325*b*.

Figure 25:
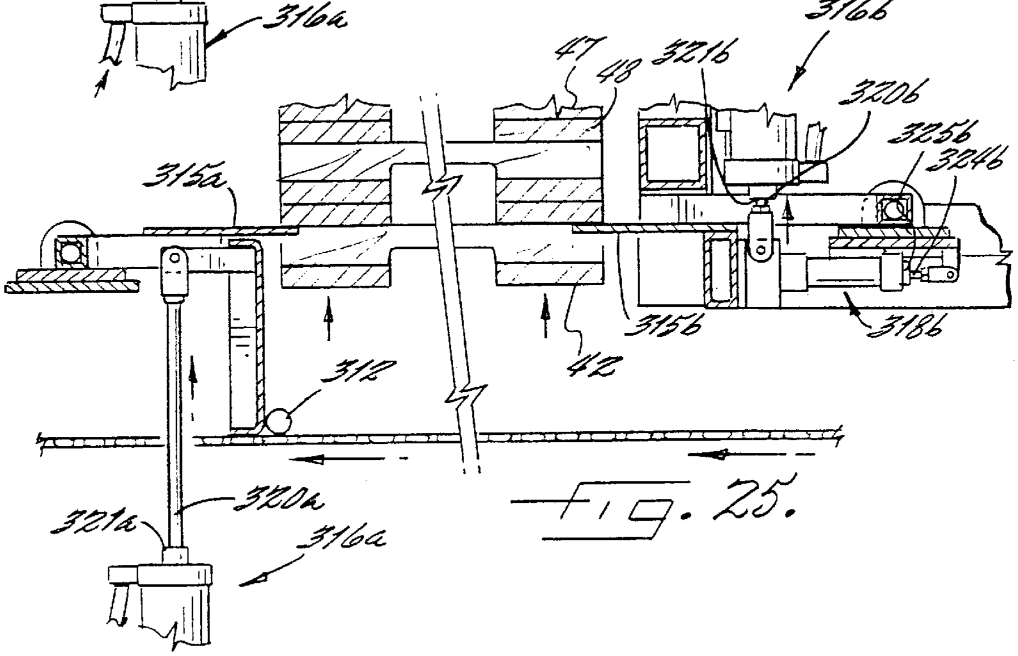

Referring now to FIG. 25, each respective lifting plate 315*a*, 315*b* has been moved upwardly in tandem by extending plunger 320*a* from its retaining cylinder 321*a*, and by retracting plunger 320*b* inwardly into its retaining cylinder 321*b*. As a result, the stack of pallets 42, 48, 47 is raised above the conveyor 306 to await the arrival of the next assembled pallet from the second pallet assembly area 154. The stacking process continues until a predetermined number of pallets, typically nineteen to twenty-three (19-23), are stacked whereupon the stack 330 is lowered onto the conveyor 306 as described below.

Figure 26:
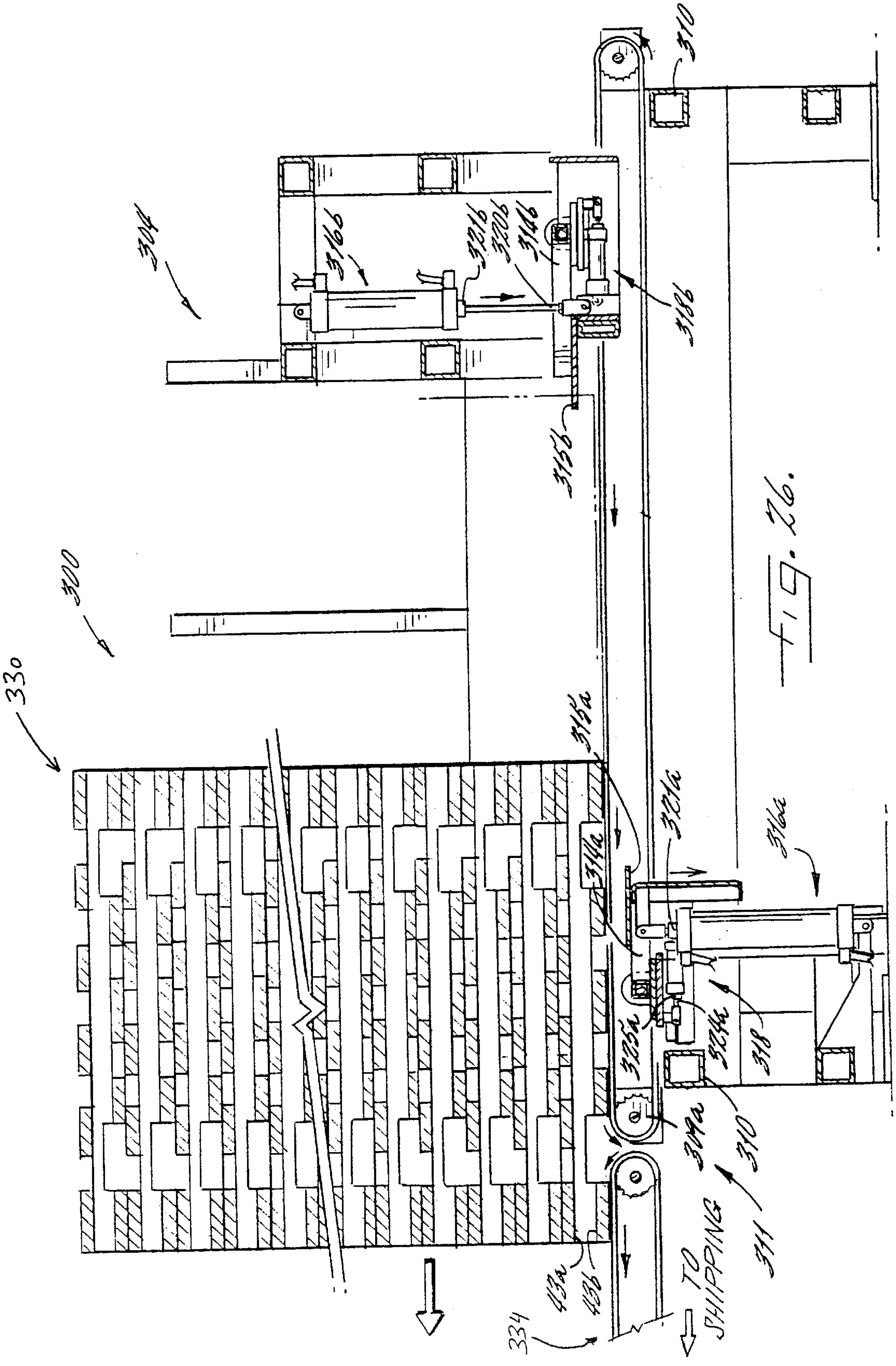

Referring now to FIG. 26, when a predetermined number of pallets are stacked as described above, the pallet stack 330 is lowered onto the conveyor 306 by lowering each respective lifting plate 315*a*, 315*b* simultaneously. As described above, the lifting plates 315*a*, 315*b* are lowered by retracting plunger 320*a* into its retaining cylinder 321*a*, and by extending plunger 320*b* outwardly from its retaining cylinder 321*b*. As illustrated, after the stack 330 is lowered onto the conveyor 306, the lifting arm 314*a* is retracted below the level of the conveyor. By retracting the lifting arm 314*a* below the level of the conveyor 306, the pallet stack 330 can move via the conveyor in the direction indicated by the arrow in FIG. 26 for subsequent removal for shipping or storage. An additional conveyor system 334 may be provided for moving the pallet stack 330 from the pallet stacking system 300. After the pallet stack 330 has been removed, the lifting arm 314*a* is raised above the conveyor 306, and the pallet stacking system 300 begins to stack another group of assembled pallets as described above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An apparatus for feeding stringers to a pallet making machine comprising:

a plurality of elongated hoppers arranged in spaced relationship, each of said hoppers configured to hold a plurality of elongated stringers in an upright stack, said stringers oriented in a substantially horizontal edgewise-adjacent configuration; and hopper loading means for loading a plurality of stringers into each of said hoppers, the hopper loading means being configured such that, prior to loading into the hoppers, the stringers are disposed as a horizontal layer in edgewise-adjacent relationship; and stringer advancing means for advancing a lowermost stringer in a stack endwise from each respective hopper to a pallet assembly area of said pallet making machine.

2. An apparatus according to claim 1 wherein said plurality of elongated hoppers are arranged in substantially parallel spaced relation.

3. An apparatus according to claim 1 wherein said stringer advancing means comprises an elongated bar configured to push said lowermost stringer in a stack endwise from each respective hopper to said pallet assembly area of said pallet making machine.

4. An apparatus according to claim 1 further comprising first sensing means for sensing stack height in each respective hopper, said first sensing means operatively coupled to said hopper loading means such that when said first sensing means determines that stack height in a hopper is below a predetermined height, said hopper loading means loads a plurality of stringers into said hopper.

5. An apparatus according to claim 4 wherein said first sensing means for sensing stack height in each respective hopper is positioned to detect endwise face height of said stringers within said hoppers.

6. An apparatus according to claim 4 wherein said hopper loading means comprises first conveying means for conveying said plurality of stringers in edgewise-adjacent substantially horizontal relation along a first direction, said first conveying means configured to deliver a predetermined number of stringers to each of said hoppers.

7. An apparatus according to claim 6 wherein said first conveying means comprises an elongated bar configured to push said plurality of stringers along said first direction.

8. An apparatus according to claim 6 comprising elevating means for elevating a stacked array of stringers to said first conveying means such that one layer of stringers is removed from said array.

9. An apparatus according to claim 6 wherein said hopper loading means comprises second conveying means for conveying a plurality of stringers in adjacent substantially horizontal relation along a second direction to said first conveying means, said second direction transverse to said first direction.

10. An apparatus according to claim 9 wherein said second conveying means comprises an elongated bar configured to push said plurality of stringers along said second direction.

11. An apparatus according to claim 9 further comprising second sensing means operatively connected to said first and second conveying means such that said first conveying means conveys a plurality of stringers along said first direction in response to said second conveying means conveying said stringers along said second direction.

12. An apparatus for feeding stringers to a pallet making machine comprising:

a plurality of elongated hoppers arranged in spaced relationship, each of said hoppers configured to hold a plurality of elongated stringers in an upright stack, said stringers oriented in a substantially horizontal edgewise-adjacent configuration;

a hopper loader that loads a plurality of stringers into each of said hoppers; and a stringer advancing unit that advances a lowermost stringer in a stack endwise from each respective hopper to a pallet assembly area of said pallet making machine.

13. An apparatus according to claim 12 wherein said plurality of elongated hoppers are arranged in substantially parallel spaced relation.

14. An apparatus according to claim 12 wherein said stringer advancing unit comprises an elongated bar configured to push said lowermost stringer in a stack endwise from each respective hopper to said pallet assembly area of said pallet making machine.

15. An apparatus according to claim 12 further comprising an elevating unit that elevates a stacked array of stringers to said first conveyor such that one layer of stringers is removed from said array.

16. An apparatus according to claim 12 further comprising a first sensor that senses stack height in each respective hopper, said first sensor means operatively coupled to said hopper loader such that when said first sensor determines that stack height in a hopper is below a predetermined height, said hopper loader loads a plurality of stringers into said hopper.

17. An apparatus according to claim 16 wherein said first sensor is positioned to detect endwise face height of said stringers within said hoppers.

18. An apparatus according to claim 16 wherein said hopper loader includes a first conveyor that conveys said plurality of stringers in edgewise-adjacent substantially horizontal relation along a first direction, said first conveyor configured to deliver a predetermined number of stringers to each of said hoppers.

19. An apparatus according to claim 18 wherein said first conveyor comprises an elongated bar configured to push said plurality of stringers along said first direction.

20. An apparatus according to claim 18 wherein said hopper loader comprises a second conveyor that conveys a plurality of stringers in edgewise-adjacent substantially horizontal relation along a second direction to said first conveyor, said second direction transverse to said first direction.

21. An apparatus according to claim 20 wherein said second conveyor comprises an elongated bar configured to push said plurality of stringers along said second direction.

22. An apparatus according to claim 20 further comprising a second sensor operatively connected to said first and second conveyors such that said first conveyor conveys a plurality of stringers along said first direction in response to said second conveyor conveying said stringers along said second direction.

23. An apparatus for feeding stringers to a pallet making machine comprising:

a plurality of elongated hoppers arranged in spaced relationship, each of said hoppers configured to hold a plurality of elongated stringers in an upright stack, said stringers oriented in a substantially horizontal edgewise-adjacent configuration;

a hopper loader that loads a plurality of stringers into each of said hoppers, said hopper loader including a first conveyor that conveys a horizontal layer of said plurality of stringers in edgewise-adjacent substantially horizontal relation along a first direction, said first conveyor configured to deliver a predetermined number of stringers to each of said hoppers; and an elevating unit that elevates a stacked array of stringers to said first conveyor such that one layer of stringers is removed from said array.

24. An apparatus according to claim 23 wherein said hopper loader further comprises a second conveyor that conveys the layer of stringers in edgewise-adjacent substantially horizontal relation along a second direction to said first conveyor, said second direction transverse to said first direction.

25. An apparatus according to claim 23 wherein said first conveyor comprises an elongated bar configured to push said plurality of stringers along said first direction.

26. An apparatus according to claim 24 wherein said second conveyor comprises an elongated bar configured to push said plurality of stringers along said second direction.

27. An apparatus for feeding stringers to a pallet making machine comprising:

a plurality of elongated hoppers arranged in spaced relationship, each of said hoppers configured to hold a plurality of elongated stringers in an upright stack, said stringers oriented in a substantially horizontal edgewise-adjacent configuration; and a hopper loader that loads a plurality of stringers into each of said hoppers, said hopper loader including a first conveyor that conveys a horizontal layer of said plurality of stringers in edgewise-adjacent substantially horizontal relation along a first direction, and a second conveyor that conveys the layer of stringers in edgewise-adjacent substantially horizontal relation along a second direction to said first conveyor, said second direction transverse to said first direction, one of said first and second conveyors configured to deliver a predetermined number of stringers to each of said hoppers;

wherein said first conveyor comprises an elongated bar configured to push said plurality of stringers along said first direction.

28. An apparatus according to claim 27 wherein said second conveyor comprises an elongated bar configured to push said plurality of stringers along said second direction.

29. An apparatus according to claim 27 further comprising a first sensor that senses stack height in each respective hopper, said first sensor operatively coupled to said hopper loader such that when said first sensor determines that stack height in a hopper is below a predetermined height, said hopper loader loads a plurality of stringers into said hopper.

* * * * *

UNITED STATES PATENT AND TRADEMARK OFFICE
CERTIFICATE OF CORRECTION

PATENT NO. : 6,736,591 B2
DATED : May 18, 2004
INVENTOR(S) : Buck

It is certified that error appears in the above-identified patent and that said Letters Patent is hereby corrected as shown below:

Column 18,
Line 30, should read -- 25. An apparatus according to claim 24 wherein said first --

Signed and Sealed this

Seventh Day of September, 2004

JON W. DUDAS
*Director of the United States Patent and Trademark Office*